United States Patent
Chandramouli et al.

(10) Patent No.: US 9,449,048 B2
(45) Date of Patent: *Sep. 20, 2016

(54) DYNAMIC PATTERN MATCHING OVER ORDERED AND DISORDERED DATA STREAMS

(71) Applicant: Microsoft Technology Licensing, LLC, Redmond, WA (US)

(72) Inventors: Badrish Chandramouli, Bellevue, WA (US); Jonathan D. Goldstein, Kirkland, WA (US); David Maier, Portland, OR (US); Mohamed H. Ali, Kirkland, WA (US); Roman Schindlauer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/276,891

(22) Filed: May 13, 2014

(65) Prior Publication Data

US 2014/0250151 A1    Sep. 4, 2014

Related U.S. Application Data

(63) Continuation of application No. 12/780,939, filed on May 17, 2010, now Pat. No. 8,762,297.

(51) Int. Cl.
*G06N 5/00*    (2006.01)
*G06F 1/00*    (2006.01)
*G06F 17/30*    (2006.01)
*G06N 99/00*   (2010.01)

(52) U.S. Cl.
CPC ....... *G06F 17/30522* (2013.01); *G06N 99/005* (2013.01)

(58) Field of Classification Search
USPC .......................................................... 706/12
See application file for complete search history.

(56) References Cited

U.S. PATENT DOCUMENTS

| | | | |
|---|---|---|---|
| 2005/0289530 A1* | 12/2005 | Robison | 717/159 |
| 2006/0059165 A1 | 3/2006 | Bosloy et al. | |
| 2008/0271141 A1 | 10/2008 | Goldman et al. | |
| 2008/0301135 A1 | 12/2008 | Alves et al. | |
| 2009/0070785 A1 | 3/2009 | Alvez et al. | |

(Continued)

OTHER PUBLICATIONS

"Non-Final Office Action Issued in U.S. Appl. No. 12/780,939", Mailed Date: Feb. 15, 2013, Filed Date: May 17, 2010, 11 pages.

(Continued)

*Primary Examiner* — Stanley K Hill
*Assistant Examiner* — Kalpana Bharadwaj
(74) *Attorney, Agent, or Firm* — Nicholas Chen; Kate Drakos; Micky Minhas

(57) ABSTRACT

Architecture introduces a new pattern operator referred to as called an augmented transition network (ATN), which is a streaming adaptation of non-reentrant, fixed-state ATNs for dynamic patterns. Additional user-defined information is associated with automaton states and is accessible to transitions during execution. ATNs are created that directly model complex pattern continuous queries with arbitrary cycles in a transition graph. The architecture can express the desire to ignore some events during pattern detection, and can also detect the absence of data as part of a pattern. The architecture facilitates efficient support for negation, ignorable events, and state cleanup based on predicate punctuations.

23 Claims, 18 Drawing Sheets

(56) References Cited

U.S. PATENT DOCUMENTS

| | | |
|---|---|---|
| 2009/0106189 A1 | 4/2009 | Jain et al. |
| 2009/0171999 A1 | 7/2009 | Mccoll et al. |
| 2011/0137942 A1* | 6/2011 | Yan et al. .................... 707/780 |
| 2011/0307488 A1* | 12/2011 | Hirai et al. .................. 707/740 |

OTHER PUBLICATIONS

"Final Office Action Issued in U.S. Appl. No. 12/780,939", Mailed Date: Jun. 20, 2013, Filed Date: May 17, 2010, 14 pages.

"Non-Final Office Action Issued in U.S. Appl. No. 12/780,939", Mailed Date: Oct. 21, 2013, Filed Date: May 17, 2010, 11 pages.

"Notice of Allowance Issued in U.S. Appl. No. 12/780,939", Mailed Date: Feb. 13, 2014, Filed Date: May 17, 2010, 5 pages.

"StreamSQL", Retrieved on: Feb. 1, 2010, 2 pages, Available at: http://www.streambase.com/products/streambasecep/streamsql/?doing_wp_cron=1400057281.3073201179504394531250.

"Complex Event Processing in the Real World", An Oracle White Paper, Sep., 2007, 13 Pages.

Tatbul, Nesime, "Streaming Data Integration: Challenges and Opportunities", In IEEE 26th International Conference on Data Engineering Workshops, Mar. 2010, pp. 155-158.

Fischer, et al., "Stream Schema: Providing and Exploiting Static Metadata for Data Stream Processing", In Proceedings of the 13th International Conference on Extending Database Technology, Mar. 22, 2010, 39 Pages.

Abadi, et al., "The Design of the Borealis Stream Processing Engine", In Proceedings of the CIDR Conference, Jan. 2005, 13 pages.

Agrawal, et al., "Efficient Pattern Matching Over Event Streams", In Proceedings of the ACM SIGMOD International Conference on Management of Data, Jun. 9, 2008, pp. 147-159.

Babcock, et al., "Models and Issues in Data Stream Systems", In Proceedings of the Twenty-First ACM SIGMOD-SIGACT-SIGART Symposium on Principles of Database Systems, Jun. 3, 2002, 30 Pages.

Babu, et al., "Exploiting K-Constraints to Reduce Memory Overhead in Continuous Queries Over Data Streams", In ACM Transactions on Database Systems, vol. 29, Issue 3, Sep. 2004, pp. 545-580.

Barga, et al., "Consistent Streaming Through Time: A Vision for Event Stream Processing", In 3rd Biennial Conference on Innovative Data Systems Research, Jan. 2007, pp. 363-374.

Chandramouli, et al., "On-the-Fly Progress Detection in Iterative Stream Queries", In Proceedings of the VLDB Endowment, vol. 2, Issue 1, Aug. 2009, pp. 241-252.

Chandrasekaran, et al., "TelegraphCQ: Continuous Dataflow Processing for an Uncertain World", In Proceedings of CIDR Conference, Jan. 2003, 12 Pages.

"Chart Pattern", Available at: http://tinyurl.com/6zvzk5, which redirects to http://en.wikipedia.org/wiki/Chart_pattern, Retrieved on: Feb. 1, 2010, 1 Page.

"Coral8, Inc.", Retrieved on: Feb. 1, 2010, 3 pages, Available at: http://www.coral8.com/.

Cranor, et al., "Gigascope: A Stream Database for Network Applications", In Proceedings of the ACM SIGMOD International Conference on Management of Data, Jun. 9, 2003, pp. 647-651.

Demers, et al., "Towards Expressive Publish/Subscribe Systems", In Proceedings of the 10th International Conference on Advances in Database Technology, Mar. 26, 2006, pp. 627-644.

Diao, et al., "Path Sharing and Predicate Evaluation for High-Performance XML Filtering", In Journal of ACM Transactions on Database Systems, vol. 28, Issue 4, Dec. 2003, 47 Pages.

Diao, et al., "Capturing Data Uncertainty in High-vol. Stream Processing", In Fourth Biennial Conference on Innovative Data Systems Research, Jan. 4, 2009, 11 Pages.

"EsperTech", Retrieved on: Feb. 1, 2010, 3 pages, Available at: http://esper.codehaus.org/.

Gyllstrom, et al., "On Supporting Kleene Closure over Event Streams", In IEEE 24th International Conference on Data Engineering, Apr. 7, 2008, pp. 1391-1393.

"'Head & Shoulders (Chart Pattern)", Available at http://tinyurl.com/6e6qtb, which redirects to http://en.wikipedia.org/wiki/Head_and_shoulders_(chart_pattern), Retrieved on: Feb. 1, 2010, 1 Page.

Jeffery, et al., "Declarative Support for Sensor Data Cleaning", In Proceedings of the 4th International Conference on Pervasive Computing, May 7, 2006, 18 Pages.

Johnson, et al., "Monitoring Regular Expressions on Out-of-Order Streams", In IEEE 23rd International Conference on Data Engineering, Apr. 15, 2007, pp. 1315-1319.

Li, et al., "Out-of-Order Processing: A New Architecture for High-Performance Stream Systems", In Proceedings of the VLDB Endowment, vol. 1, Issue 1, Aug. 2008, pp. 274-288.

Liu, et al., "Sequence Pattern Query Processing over Out-of-Order Event Streams", In IEEE 25th International Conference on Data Engineering, Mar. 29, 2009, pp. 784-795.

Maier, et al., "Semantics of Data Streams and Operators", In Proceedings of the 10th International Conference on Database Theory, Jan. 5, 2005, pp. 37-52.

Majumder, et al., "Scalable Regular Expression Matching on Data Streams", In Proceedings of the ACM SIGMOD International Conference on Management of Data, Jun. 9, 2008, pp. 161-172.

Motwani, et al., "Query Processing, Approximation, and Resource Management in a Data Stream Management System", In First Biennial Conference on Innovative Data Systems Research, Jan. 3, 2003, 12 Pages.

"Oracle Inc.", Retrieved on: Feb. 1, 2010, 1 page, Available at: http://www.oracle.com/index.html.

Ryvkina, et al., "Revision Processing in a Stream Processing Engine: A High-Level Design", In Proceedings of the 22nd International Conference on Data Engineering, Apr. 3, 2006, 3 Pages.

Srivastava, et al., "Flexible Time Management in Data Stream Systems", In Proceedings of the Twenty-Third ACM SIGMOD-SIGACT-SIGART Symposium on Principles of Database Systems, Jun. 14, 2004, pp. 263-274.

"Stream Base Inc.", Retrieved on: Feb. 1, 2010, 2 pages, Available at: http://www.streambase.com/.

Tucker, et al., "Exploiting Punctuation Semantics in Continuous Data Streams", In IEEE Transactions on Knowledge and Data Engineering, vol. 15, Issue 3, May 2003, pp. 555-568.

Viglas, et al., "Rate-Based Query Optimization for Streaming Information Sources", In Proceedings of the ACM SIGMOD International Conference on Management of Data, Jun. 3, 2002, pp. 37-48.

Woods, W. A., "Transition Network Grammars for Natural Language Analysis", In Communications of theACM, vol. 13, Issue 10, Oct. 1970, pp. 591-606.

Wu, et al., "High-Performance Complex Event Processing over Streams", In Proceedings of the ACM SIGMOD International Conference on Management of Data, Jun. 27, 2006, pp. 407-418.

Yu, et al., "Fast and Memory-Efficient Regular Expression Matching for Deep Packet Inspection", In ACM/IEEE Symposium on Architecture for Networking and Communications Systems, Dec. 3, 2006, pp. 93-102.

"Complex Event Processing", Retrieved on: Feb. 1, 2010, 2 pages, Available at: http://www.oracle.com/technologies/soa/complex-event-processing.html.

\* cited by examiner

╔══════════════════════════════════════════════════════════╗
ALGORITHM 1: ATM INSERTION (HANDLING OUT-OF-ORDER INPUT)
╠══════════════════════════════════════════════════════════╣

```
1  InsertEvent(event e) begin
2      if out of order then RemoveInvalidatedSequences(e.LE);
3      entry x ← rbtree.Search≤(e.LE) ;   // Get previous pmatch list
4      entry y ← new entry;
5      y.event ← e; y.list ← Make Transitions(x.list, e);
       // Try to create new pmatch from start state & register
6      y.list.Append(New Transition(q₀,Z,e);
7      foreach pmatch p in y.list do
8          if p.q ∈ F then p.InsertOutputEvent();

9      rbtree.AddEntry(e.LE, y) ;   //List y will be in StartLE order
10     if out of order then PropagateInsert(y);
11 end
12 RemoveInvalidatedSequences(timestamp t) begin
13     entry e ← rbtree.Search≤(t); boolean done ← false;
14     while not done do
15         done ← true;                    //Early stopping condition
16         pmatch p ← e.list.Head;
17         while p.StartLE ≤ t do          //Delete invalid pmatches
18             if p.q ∈ F then p.RetractOutputEvent();
19             done ← false; delete p; p ← e.list.Head;

20         e ← e.Next;

21 end
22 PropagateInsert(entry y) begin
23     list z ← y.list;
24     while z is not empty do
25         y ← y.Next;
26         z ← MakeTransitions(z, y.event);
           // Reverse append to maintain (Ordering) invariant
27         y.list.AppendFront(z.Reverse)

28 end
```

| ALGORITHM 2: COMPUTING PATH PUCTUATIONS. |
|---|
| 1  ComputePathPunctuation(path $p = a_1 \ldots a_k$) begin |
| 2     $\quad \bar{\pi} \leftarrow \pi_1$; |
| 3     $\quad$ foreach *arc $a_j$ in ordered path p* do |
| 4     $\quad\quad$ $e \leftarrow$ earliest s.t. $e.\text{LE} \leq \bar{\pi}$ and $f_j^E(e)$ is true; |
| 5     $\quad\quad$ $t \leftarrow \min(e.\text{LE}, \pi_j)$; |
| 6     $\quad\quad$ $\bar{\pi} \leftarrow \max(\bar{\pi}, t)$; |
| 7     $\quad$ return $\min(\bar{\pi}, t_a)$; |
| 8  end |

*FIG. 14*

DYNAMIC PATTERN MATCHING OVER ORDERED AND DISORDERED DATA STREAMS

CROSS-REFERENCE TO RELATED APPLICATION(S)

This application is a continuation of U.S. patent application Ser. No. 12/780,939, entitled "Dynamic Pattern Matching Over Ordered and Disordered Data Streams," filed May 17, 2010, which is incorporated herein by reference in its entirety.

BACKGROUND

The advent of the digital age has made large-scale data acquisition and online processing a crucial component of modern systems. A data stream management system (DSMS) is a system that enables applications to issue long-running continuous queries (CQs) that efficiently monitor and process streams of data in realtime. Data stream systems are used for data processing in a broad range of applications including clickstream analysis, fraud detection, monitoring RFID (radio-frequency identification) readings from sensors (e.g., for manufacturing and inventory control), and algorithmic trading of stocks, for example.

A class of CQs that have recently garnered significant attention is pattern CQs, where the user is interested in detecting patterns across time in a data stream. For instance, given a realtime stock quote stream, it may be desirable to detect when a stock price increases. While this simple pattern can be detected using existing mechanisms such as self-joins over windowed streams, more complex patterns involving unbounded looping operations are not expressible using standard DSMS operators. Existing pattern-detection techniques for DSMSs impose restrictions on expressiveness or on input stream ordering (or both) that make such techniques inadequate for modern stream applications.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture introduces a new pattern operator referred to as an augmented transition network (ATN), which is a streaming adaptation of non-reentrant, fixed-state ATNs. Briefly, an ATN is a non-deterministic finite automaton (NFA) where additional user-defined information (called a register) is associated with automaton states and is accessible to transitions during execution.

Each computation is associated with additional information in the form of a fixed-size register, which can be accessed and manipulated by transitions. ATNs have no restrictions on the allowed transition graphs. As a result, ATNs can be created that directly model complex pattern continuous queries (CQs) with arbitrary cycles in a transition graph. Additionally, the architecture is sufficiently rich to express the desire to ignore some events during pattern detection, and can also detect the absence of data as part of a pattern.

The added power of ATNs over traditional NFAs facilitates expressing a wide variety of common pattern-detection queries. ATNs are versatile and can be used in innovative ways, such as for patterns over uncertain streams, user-defined operators, and stream data cleaning. Furthermore, specific restrictions imposed on ATN state and recursion allow an efficient implementation, while retaining significant expressiveness and supporting native handling for out-of-order (disordered) input events. A new capability is dynamic patterns, that is, patterns that can be changed while the CQ is executing. The architecture addresses dynamic patterns and the efficient execution thereof. The architecture also facilitates efficient support for negation, ignorable events, and state cleanup based on predicate punctuations, for example.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 11 illustrates an insert algorithm that handles in-order and out-of-order events.

FIG. 14 illustrates an algorithm for computing path punctuations.

DETAILED DESCRIPTION

Figure 1:
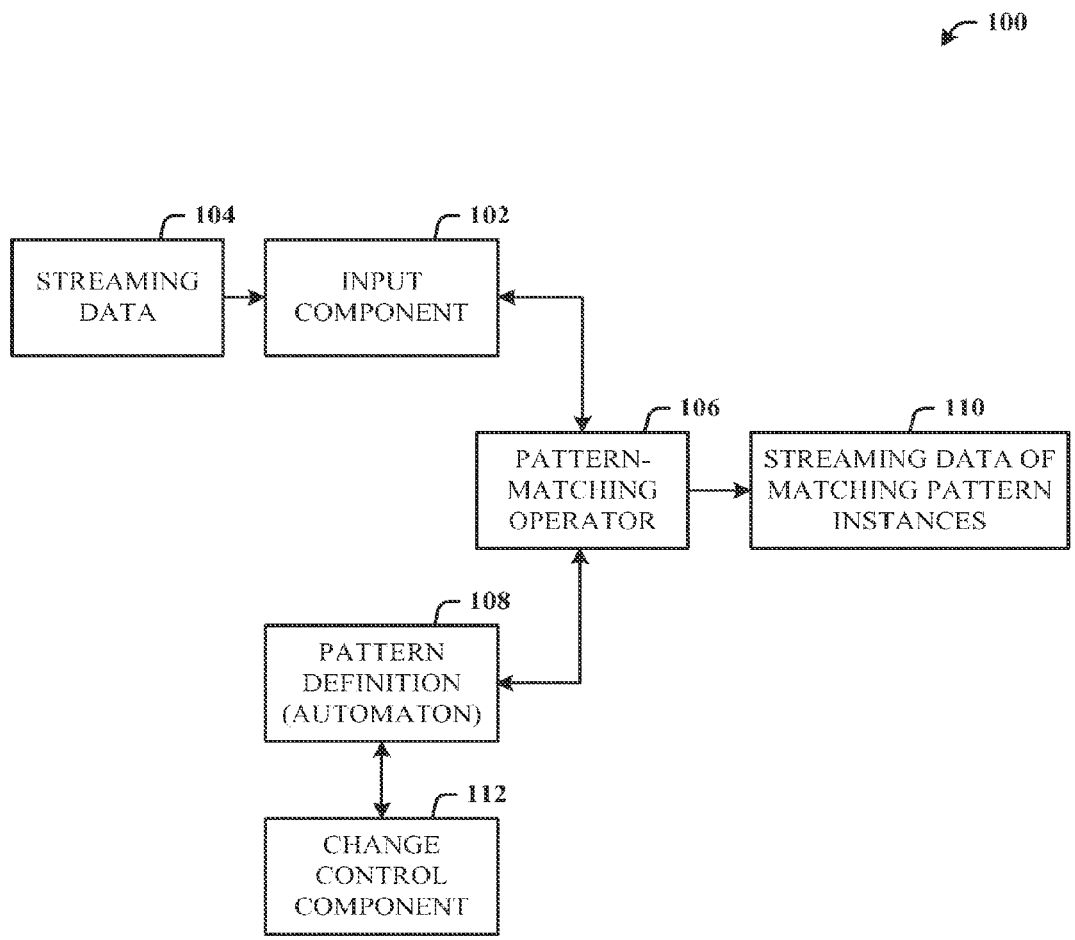
FIG. 1 illustrates a data stream management system in accordance with the disclosed architecture.

The disclosed architecture introduces a new pattern-matching operator called an augmented transition network (ATN), which is a streaming adaptation of non-reentrant, fixed-state ATNs. Briefly, an ATN is a non-deterministic finite automaton (NFA) where additional user-defined information (called a register) is associated with automaton states and is accessible to transitions during execution.

In the context of languages, for example, a discrete automaton (an abstract machine) is a finite state machine that takes a symbol as input and transitions from one state to another state based on a transition function. Where words comprise symbols, the automaton reads and processes symbols until a word is accepted or rejected.

The added power of ATNs over traditional NFAs is useful and necessary to express a wide variety of common pattern-detection queries. ATNs are versatile and can be used in innovative ways for patterns over uncertain streams, user-defined operators, and stream data cleaning, for example. Moreover, specific restrictions imposed on ATN state and recursion allows a very efficient implementation, while retaining significant expressiveness and supporting native handling for out-of-order (disordered) input events. A new capability provided in a data stream management system (DSMS) is that of dynamic patterns that can change during execution of the ATN operator. Additionally, other aspects related to the ATN operator include efficient support for negation, ignorable events, and state cleanup based on predicate punctuations.

More specifically, the architecture addresses the problem of supporting efficient pattern matching over streaming data, by providing the ability to: handle expressive patterns beyond simple regular expressions, with clean streaming semantics; efficiently support new incoming events as well as events that delete (or modify the lifetime of) existing events; support pattern queries that can change over time, allowing automatic modification of the pattern being monitored; and optimize the performance in case of several common application scenarios.

The architecture provides the new ability to natively handle dynamic patterns. As information is gained from data mining, for example, the pattern being monitored is adjusted on-the-fly. Stream pattern matching, with the ability to carry bounded additional state as part of the automaton, is a new and highly desirable value-addition in many application domains including algorithmic trading, RFID monitoring, manufacturing, clickstream analysis, and stream data cleaning. The architecture provides algorithms for disordered streams (with new events as well as events that modify and/or delete existing older events) in an efficient and maximally speculative fashion. A relational-style algebra with clean semantics is provided for stream pattern matching, independent of order and pattern dynamism.

Optimizations are disclosed to handle ignorable events. For example, if users are looking for a small set of events amongst a relatively large set of events these irrelevant events can be ignored thereby providing a more performant system at least in terms memory utilization and throughput. Other optimizations such as punctuation-based cleanup and negative patterns are also provided.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a data stream management system 100 in accordance with the disclosed architecture. The system 100 includes an input component 102 that receives streaming data 104 having a pattern of events to be matched. A pattern-matching operator 106 operates over the streaming data 104 to find the pattern based on a pattern definition 108 received as a streaming input. The pattern definition 108 characterizes the pattern as an automaton having states represented as nodes and transitions between the states represented as arcs. The input component 102 facilitates smooth interfacing of the streaming data 104 to the pattern-matching operator 106. An output of the pattern-matching operator is streaming data of matching pattern instances 110.

A change control component 112 facilitates the replacement of the existing pattern definition with a new pattern definition that is then used by the pattern-matching operators to detect new patterns in the streaming data 104. Note that although depicted as external to the pattern-matching operator 106, the pattern definition 108 can be considered an internal component of the pattern-matching operator 106.

The automaton states have associated data of a form specified by a user that facilitates expressive pattern matching. An arc in the automata has associated user-defined information that includes a fence function that indicates if transition along an arc can occur based on data associated with states, and a transfer function that computes new values for the data associated with states. The pattern-matching operator 106 processes ordered and disordered patterns of the streaming data 104. The pattern-matching operator 106 handles negative patterns without first generating false-positive patterns. The pattern-matching operator 106 also facilitates introduction of a user-defined operator. These capabilities are described in greater detail herein.

Figure 2:
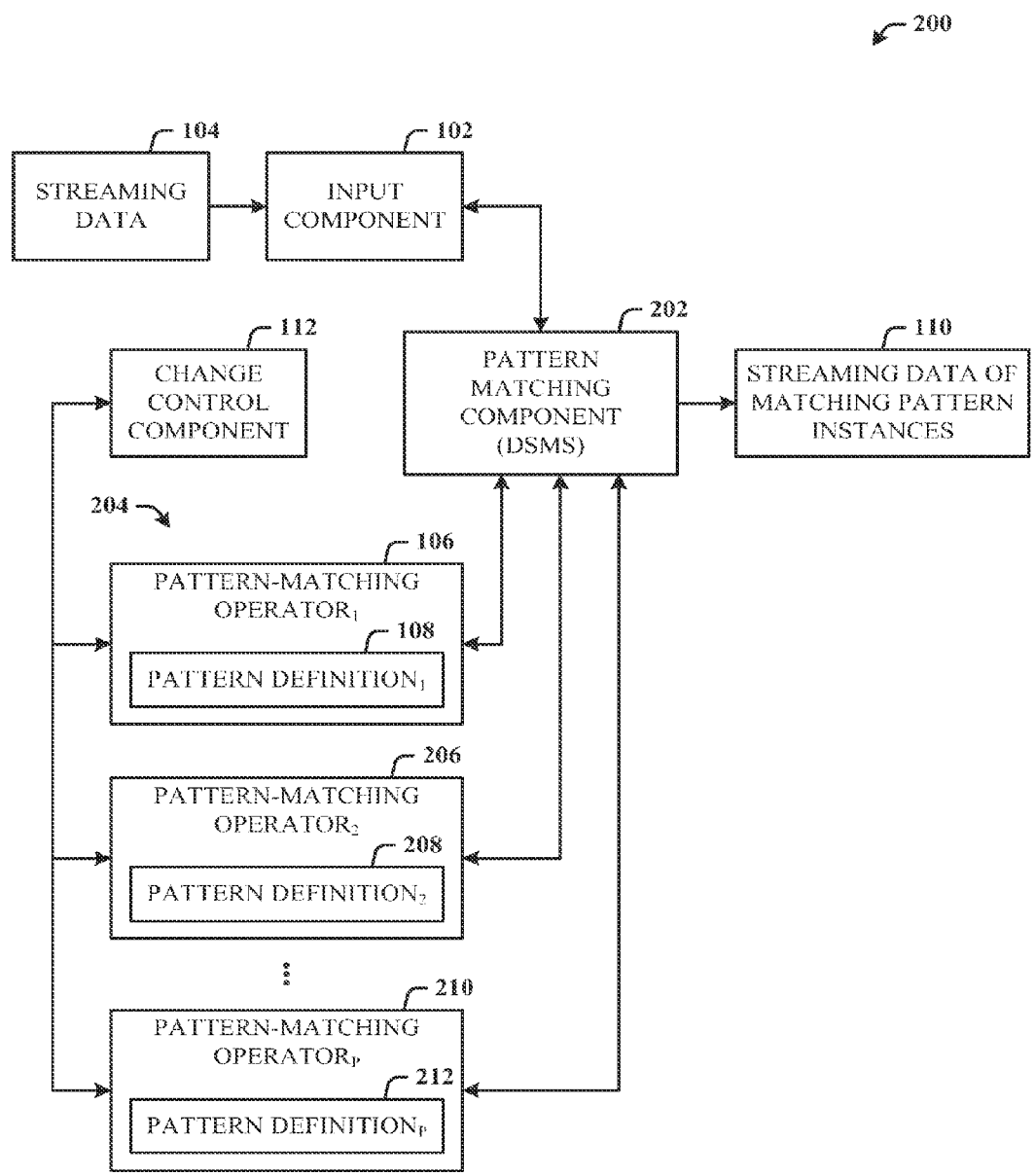
FIG. 2 illustrates an alternative embodiment of a data stream management system in accordance with the disclosed architecture.

FIG. 2 illustrates an alternative embodiment of a data stream management system 200 in accordance with the disclosed architecture. The system 200 includes a pattern-matching component 202 (e.g., a DSMS) that receives and process at least the streaming data 104 (e.g., stock reports, sensor data, etc.), but possibly one or more additional inputs of streaming data. Here, the input component 102 prepares the streaming data 104 for input to the pattern matching component 202, for further processing by one or more pattern-matching operators 204.

As previously indicated, the pattern definitions (e.g., pattern definition 108) can be expressed as automata. The one or more events of the streaming data 104 contain the changes to the pattern definition in terms of arcs (transitions) as utilized in an automaton. The above assumes dynamic patterns. In the case of static patterns (where the pattern definition does not change with time), the "constant" pattern definition can be provided to the pattern-matching operator 106 at initialization time only.

The pattern-matching operators 204 can include the operator 106 (and associated definition 108), as well as a second pattern-matching operator 206 and associated second pattern definition 208, as well as additional pattern-matching operators 210 and associated pattern definitions 212.

The different definitions (108, 208, and 212) are designed to define different patterns of interest in the streaming data 104. As before, the change control component 112 can be utilized to change any one or more of the definitions (108, 208, and 212) of the corresponding operators (106, 206, and 210).

Note that the pattern matching component 202 can select one or more of the operators 204 to apply over the streaming data 104, or other streams being received. In a more robust implementation, it can be the case, where the operator 106 is applied to generate the matching patterns instances 110, and then the second operator 206 (and definition 208) is applied to the matching patterns instances 110 (internally via the matching component 202) to then generate another set of matching patterns instances (not shown). Accordingly, this configuration can be extended to one or more of the operators 204 further being applied to the matching pattern instances generated by other operators.

Figure 3:
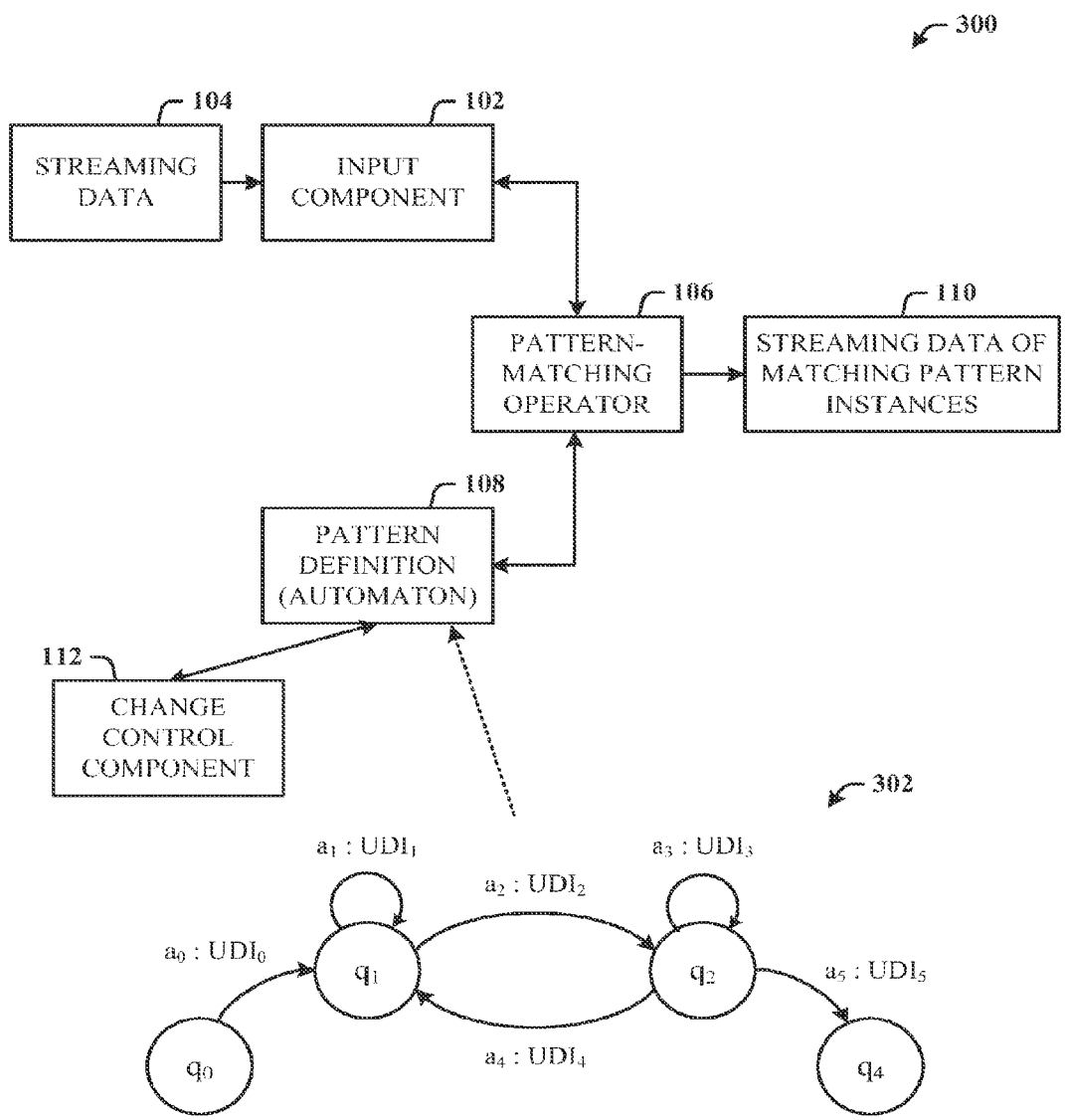
FIG. 3 illustrates a more detailed data stream management system.

FIG. 3 illustrates a more detailed data stream management system 300. The system 300 includes the input component 102 that receives the streaming data 104 of events. The input includes events, which may contain instances of the patterns described by the automata. The pattern definition 108 is associated with an automaton 302, the automaton 302 having state as nodes, the transitions represented as arcs (denoted a) between the states, and user-defined information (UDI) (bounded or unbounded) associated with the arcs. As described in greater detail herein, the UDI includes a fence function and transfer function.

In one example automaton, the automaton 302 has an input state q0 that can transition to a second state q1 (via a first arc $a_0$). The first arc $a_0$ also has associated $UDI_0$. The second state q1 has a second self-loop arc $a_1$ (transition), and the second loop arc $a_1$ has associated $UDI_1$. This UDI applies to the other arcs (transitions) as well.

The pattern-matching operator 106 can operate using arbitrary automata and associated user-defined information to process the streaming data 104, which includes ordered and disordered streaming data, and detects patterns in the ordered and disordered streaming data. In addition, the pattern matching operator 106 can seamlessly handle modifications to the pattern definition 108 (based on the automaton changes that arrive on the second streaming input).

The user-defined information includes a fence function that indicates if a transition along an arc can occur and a transfer function that computes new user-defined information based on the transition. The pattern matching component 202 employs an event algorithm that optionally processes ignorable events of the streaming data and a cleanup algorithm that performs punctuation-based cleanup to delete partial match records. The cleanup algorithm only deletes partial matches that it can determine will no longer be needed. However, there may still be other partial match events that still need to be retained. The pattern-matching operator 106 handles negative patterns without first generating false-positive patterns. The pattern matching component 202 controls speculation based on pre-computation of expected out-of-order events in the streaming data. Events are indexed by sequence number only if sequence numbers are available from the source. This is an optimization. In general, if sequence numbers are not available, the operator will still work by indexing events based on event timestamps (with maximal pre-computation of expected out-of-order events). The pattern matching component 202 can optionally employ predicated punctuation and a graph structure to determine registers and events for deletion.

The ATN operator (pattern-matching operator 106) uses data structures described herein to support streaming semantics. Semantics are defined for supporting dynamic patterns by treating ATN arcs as a second streaming input to the operator, which can change over time using inserts, deletes, lifetime changes (similar to regular events).

Figure 4:
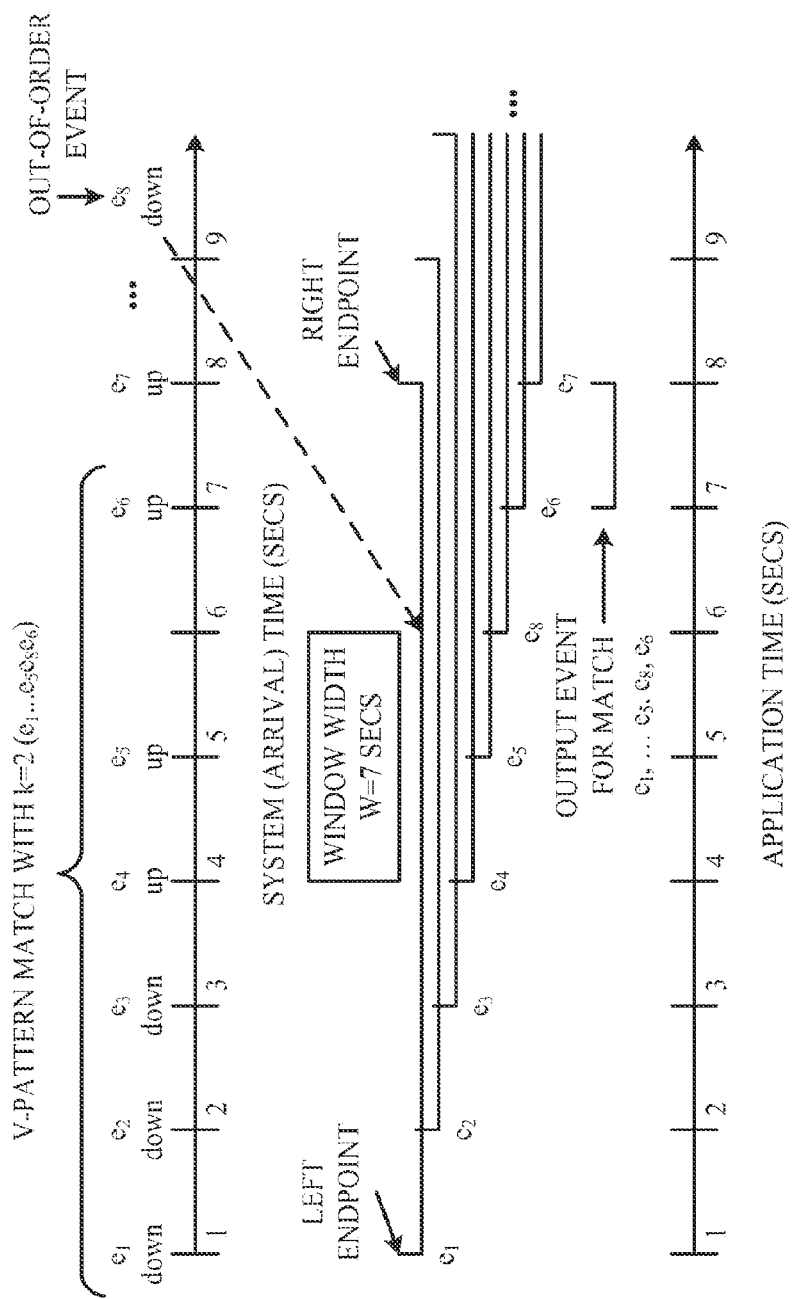
FIG. 4 illustrates a streaming model for dynamic pattern matching.

FIG. 4 illustrates a streaming model 400 for dynamic pattern matching. A stream is a potentially unbounded sequence $e_0, e_1, \ldots$ of events. An event $e_i = \langle p, c \rangle$ is a notification from the outside world (e.g., from a sensor) that comprises two parts: (1) a payload $p = \langle p_1, \ldots, p_k \rangle$, which conforms to a pre-defined event schema $\overline{E}$, and (2) a control parameter c that provides metadata about the event. While the exact nature of the control parameter associated with events varies across systems, two common notions in the context of pattern CQs over streams are: (1) an event generation time, and (2) a time window, which indicates the period of time over which event can influence output (i.e., contribute to a valid pattern). These are captured by defining $c = \langle LE, RE \rangle$, where the time interval [LE, RE] specifies the period (or lifetime) over which the event contributes to output. The left endpoint (LE) of this interval is the application time of event generation, also called the event timestamp. Assuming a window of width w time units, the right endpoint of an event is simply RE=LE+w. In case there is no windowing, RE is set to ∞. A stream is said to be disordered if events may arrive out-of-order with respect to associated event timestamps. Note that the system (arrival) time is not included as a control parameter.

The streaming model 300 (top) shows eight events $(e_1, \ldots, e_8)$ in arrival order. Here, $e_8$ is an out-of-order event whose actual timestamp (LE) is six. The model 400 (bottom) shows the event lifetimes, assuming a window of width w=7 seconds.

Figure 5:
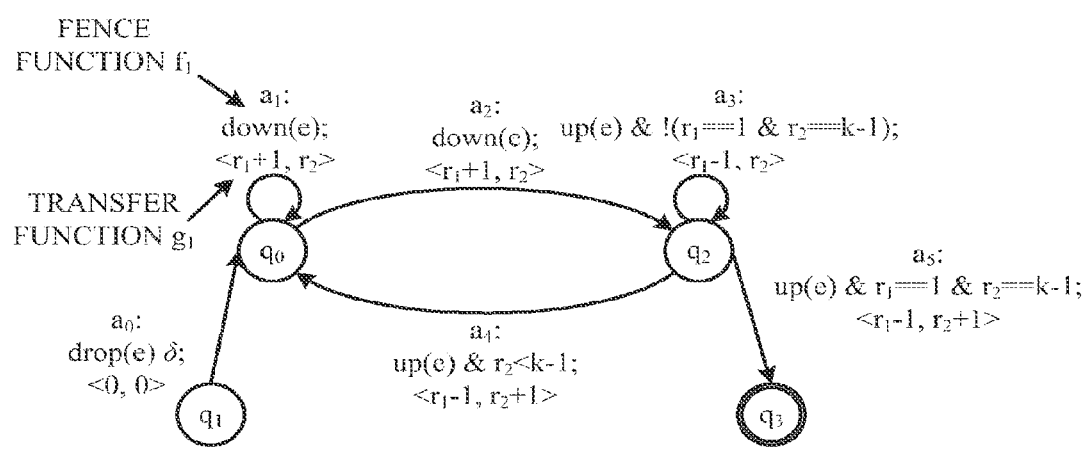
FIG. 5 illustrates an example ATN for a V-pattern query in a stock trading example.

FIG. 5 illustrates an example ATN 500 for a V-pattern query in a stock trading example. Consider the following stock trading example application. An automated stock-trading application is implemented to use a DSMS to perform technical analysis to detect interesting chart patterns in realtime. Here, each event in the stream contains stock data such as symbol, price, price change, and volume. A detected pattern may result in automated trading decisions such as to buy or sell shares. A simple example is the V-pattern, where consecutive stock events are searched that include downticks followed by upticks. Other examples of chart patterns include wedge, double top, and candlestick.

A pattern CQ, called $Q_1$, is constructed to detect a sudden large price drop (of δ), followed by a sequence of k consecutive V-pattern occurrences, such that the total number of upticks is equal to the total number of downticks (across the k V-patterns). Here, k is large and may not be known in advance. The stopping condition can also be data-dependent—a pattern CQ, called $Q_2$, can be constructed to report the number of consecutive V-patterns (after a large price drop) until the price reaches the original price before the drop.

An ATN is a directed graph with labeled nodes called states, labeled edges between states called arcs, a special start state, and a set of special final states. In addition, an ATN uses additional computation state, called a register, which is associated at runtime with each active state. In order to suit the stream setting, the definition of registers is refined as follows: a register comprises a fixed number of fields $r = \langle r_1, \ldots, r_k \rangle$ and conforms to a predefined register schema $\overline{R}$.

Definition 1 (ATN). An ATN is a 7-tuple $M = (Q, A, q_0, F, Z, \overline{E}, \overline{R})$, where $Q = \{q_0, \ldots, q_{n-1}\}$ is the set of states, $A = \{a_0, \ldots, a_{m-1}\}$ is the set of arcs, $q_0$ is the start state, F is the set of final states, Z is the initial register, $\overline{E}$ is the event schema, and $\overline{R}$ is the register schema. Each arc $a_i$ is labeled with a pair of functions with signatures $f_i$ ($\overline{E}, \overline{R}$) and $g_i$($\overline{E}$, R) each operating over an event and a register. These two functions are referred as the fence function and the transfer function, respectively.

Note that an arc can be defined between any arbitrary pair of states. The fence function $f_i(E, R)$ returns a Boolean value that determines if a transition along that arc can be triggered, and, if so, the transfer function $g_i (E, R)$ computes the new register that is associated with the execution after the successful transition. An arc can also be defined as a special ϵ-arc that does not consume any event, and whose functions operate only over the register.

Referring again to the ATN 500, the register comprises a pair of integer fields $\langle r_1, r_2 \rangle$. Field $r_1$ tracks the difference between the number of downticks and the number of upticks across V-patterns, while $r_2$ tracks the number of consecutive V-patterns detected thus far. $Q=\{q_0, \ldots, q_3\}$, $A=\{a_0, \ldots, a_5\}$, $F=\{q_3\}$, and $Z=\langle 0, 0 \rangle$. Each arc $a_i$ is annotated with fence function $f_i$ (to determine whether the transition is triggered) and transfer function $g_i$ (for the new register content). Methods up(e) and down(e) determine if event e is an uptick or a downtick, while drop(e) indicates the magnitude of the drop. For instance, arc $a_1$ checks if event e is a downtick; if yes, it increments $r_1$ while leaving $r_2$ unchanged.

With respect to ATN computation, consider a contiguous ordered event subsequence s. The computation of an ATN M is formalized using an instantaneous description (ID) of M as a 3-tuple (α, q, r), where α is the subsequence of events that have not been processed, q∈Q is the current state, and r (with schema R) is the current register. The initial ID is (s, $q_0$, Z). Transitions are denoted using the next-ID relation $\vdash_M$. For each event-consuming arc $a_i \in A$ from state q to state q', the following relation (eα, q, r)$\vdash_M$ (α, q', r') if and only if $f_i(e,r)$ is true and $g_i(e,r)=r'$. If $a_i$ is an ϵ-arc, the relation (α, q, r)$\vdash_M$ (α, q', r') if and only if $f_i (-, r)$ is true and $g_i(-,r)=r'$.

The relation $\vdash_M$ computes one step of M, while the reflexive, transitive closure $\vdash^*_M$ computes zero or more steps of M. The ATN M is said to accept the subsequence s (i.e., recognize the pattern) if (s, $q_0$, Z)$\vdash^*_M$ (∅, q, z), where q∈F and ∅ denotes an empty sequence.

Continuing with the trading example with $Q_1$, each event is either an uptick or a downtick. The ATN 500 of FIG. 5 (with k=2) is computed over the ordered event sequence s=$e_1 \ldots e_5 e_8 e_6$ of FIG. 4. The initial ID is (s, $q_0$, $\langle 0, 0 \rangle$). When event $e_1$ is consumed, it triggers the function $f_0$ associated with $a_0$, the only outgoing arc from $q_0$. Assuming $e_1$ is a price drop greater than δ, the new register is computed using $g_0$ and the ATN completes the step ($e_1 \ldots e_5 e_8 e_6$, $q_0$, $\langle 0, 0 \rangle$)$\vdash_M$($e_2 \ldots e_5 e_8 e_6$, $q_1$, $\langle 0, 0 \rangle$). Next, downtick $e_2$ can be consumed by both arcs $a_1$ and $a_2$, giving two possible next-IDs, ($e_3 e_4 e_5 e_8 e_6$, $q_1$, $\langle 1, 0 \rangle$) and ($e_3 e_4 e_5 e_8 e_6$, $q_2$, $\langle 1, 0 \rangle$). It is seen that there can be multiple next-ID relations, not all of which lead to acceptance.

In the example, the sequence of computations ($e_1 \ldots e_5 e_8 e_6$, $q_0$, $\langle 0, 0 \rangle$)$\vdash_M$ ($e_2 \ldots e_5 e_8 e_6$, $q_1$, $\langle 0, 0 \rangle$)$\vdash_M$ ($e_3 e_4 e_5 e_8 e_6$, $q_1$, $\langle 1, 0 \rangle$)$\vdash_M$ ($e_4 e_5 e_8 e_6$, $q_2$, $\langle 2, 0 \rangle$)$\vdash_M$ ($e_5 e_8 e_6$, $q_2$, $\langle 1, 0 \rangle$)$\vdash_M$ ($e_8 e_6$, $q_1$, $\langle 1, 0 \rangle$)$\vdash_M$ ($e_6$, $q_2$, $\langle 1, 1 \rangle$)$\vdash_M$ (∅, $q_3$, $\langle 0, 2 \rangle$) leads to s being accepted by M since $q_3 \in F$.

With respect to the streaming ATN operator, the semantics are now defined. The pattern output is described in an order-independent manner by specifying the output stream as a set of events computed in terms of the set of all input events.

Definition 2 (Streaming ATN Operator). Given (1) an ATN M=(Q, A, $q_0$, F, Z, E, R), and (2) an input stream that consists of a (possibly countably infinite) set of events I, let I denote the ordered sequence based on LE, of all events in I, and S denote the set of all possible contiguous subsequences of I (it is assumed that timestamps are unique). A clean extension to non-unique timestamps is straightforward based on the concept of "multi-events" introduced herein. (The disclosed algorithms also extend naturally.) The output stream of a streaming ATN operator $O_M$ is a (possibly countably infinite) set of events O defined as follows. An output event $e_i=\langle p_i, c_i \rangle$ where $p_i=z$ and $c_i=\langle LE, RE \rangle$, belongs to O iff, for some sequence s∈S, have (s, $q_0$, Z)$\vdash^*_M$ (∅, q, z) where q∈F (i.e., M accepts s) and [LE, RE) is the intersection of all event lifetimes in s.

In the running example, the event sequence s=$e_1 \ldots e_5 e_8 e_6$ forms a valid match for $Q_1$, resulting in a single output event with the lifetime shown in FIG. 3 (bottom). The definition of output lifetime naturally prevents matches across events that are not within the window w (e.g., across $e_1$ and $e_7$ in FIG. 4). The events that contribute to a match e can be reconstructed if needed, by looking for events in the input stream whose lifetime [LE, RE)⊇[e. LE, e. RE). As an aside, note that associated with any application time t, there is a collection C(t) of input events (ordered by LE) that are live at t, that is, have a lifetime that is stabbed by t. The operator has the desirable changing relation property that an output event is live at t if and only if C(t) contains the corresponding event subsequence that M accepts.

With respect to speculation, the streaming ATN operator semantics are described declaratively, in the presence of disorder. The disclosed implementation operationally ensures that on any prefix of the input, the output event stream adheres to the semantics above. Thus, an output may be produced that may need to be withdrawn subsequently due to an out-of-order input event. This situation is referred to as speculation. In order to undo the effect of previously issued events, the streams support the notion of event retraction, where an event serves to remove a previous event from the event sequence. A retraction has the same payload and control parameters as the original event, with an additional bit indicating that it is a retraction. Speculative input can be handled and maximally speculative output produced, but aggressive speculation may not always be desired. Techniques for controlling speculation are described herein.

With respect to punctuations, there is a need to ensure that an event is not arbitrarily out-of-order. The lack of such a facility causes two issues:

Any produced output is never to be declared "final" (it cannot change due to future events). This declaration of output as final is useful in many cases (e.g., when preventing false-positives in scenarios where correctness is important, such as directing an automatic power plant shutdown based on detected anomalies.

Historic state cannot be cleaned in the DSMS, since it may be needed forever in order to adjust previous output.

To solve this, the notion of stream progress is provided, which is realized using time-based punctuations. A time-based punctuation is a special event that is used to indicate time progress—it is associated with a timestamp t and indicates that there will be no future event in the stream with a timestamp of less than t. As described herein, punctuations can provide output guarantees and perform state cleanup for ATNs, and predicate-based punctuations further optimize cleanup.

Figure 6:
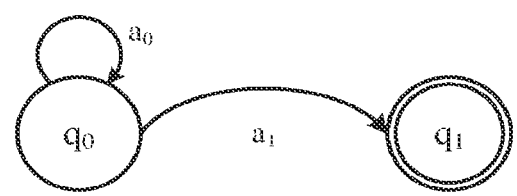
FIG. 6 illustrates an example of a two-state ATN.

Constrained augmented NFA (CAN) based approaches cannot express patterns with arbitrary arcs, such as the one in FIG. 5. It might appear that this limitation of CAN may be overcome by the following strategy. First, add register entries to maintain the set of "active" NFA states (thus, the register uses O(n) space, where n is the number of NFA states). Next, define a simple two-state ATN (FIG. 6 illustrates a two-state ATN 600), where the self-loop transition $a_0$ encodes all actions corresponding to the original automaton, updating register contents to simulate transitions to subsequent NFA states. However, this strategy has several disadvantages: it is less efficient, it amounts to writing a customized user-defined function to handle a particular pattern, the self-loop does nothing more than feed events sequentially to the user-code (and thus can no longer perform operator level optimizations such as efficient handling of out-of-order events, ignorable events, etc.), dynamic patterns cannot be supported, and allowing unconstrained augmented NFA graphs directly allows is a more natural way of expressing the pattern, easier to modify, and makes implementation cleaner when there are multiple partial matches "in-flight" at once.

Figure 7:
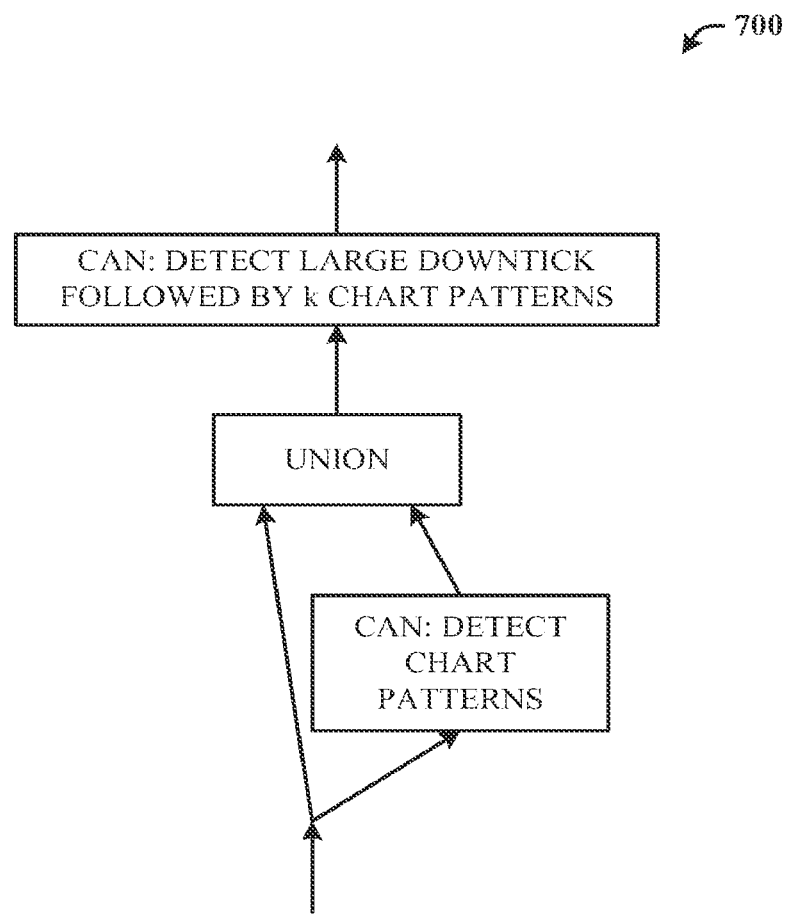
FIG. 7 illustrates an example CAN query plan.

Another alternative is to partition the pattern into multiple CAN operators in a CQ plan. For example, an ATN that looks for a large price drop followed by k chart patterns (where k may be data dependent) can be created using the CAN query plan 700 in FIG. 7, where one CAN operator detects every chart pattern, and another CAN operator detects a large price-drop followed by k chart patterns. However, this solution is highly inefficient: (1) there is a need to detect every chart pattern even though interest is in chart patterns only after a large price drop, and (2) there is overhead due to several operators and event queues in the plan. Further, this alternative makes writing the pattern CQ more difficult as compared to directly specifying an automaton.

With respect to specifying and using ATNs, consider the specification provided as input to the ATN execution model. Beyond compiling existing pattern languages to ATNs, a convenient and flexible alternative is a frontend tool that allows users to construct the ATN directly. The ATN operator accepts the ATN specification as a set of states and arcs. For each arc $a_1$, the specification provides the source and destination state, and the two functions $f_i$ and $g_i$. The functions can be specified in languages such as C++ or C#, or SQL-like expressions that are type-checked, bound to the event and register schemas, and converted into code at CQ compile-time. For instance, the arc $a_1$ in FIG. 5 can be succinctly written using anonymous functions (e.g., .NET lambda expressions)

$f_1:(e,r) \Rightarrow down(e)$ $g_1:(e,r) \Rightarrow new\ Register(r:r1+1,r:r2)$ Following is illustration of the generality of the disclosed approach by showing how to cast a variety of applications into the execution model.

Uncertain data streams, where the content of each event in the stream is not known with certainty, are becoming increasingly commonplace. For example, uncertainty is common in RFID networks, GPS networks, and environmental monitoring. Assume that each event $e_i$ is associated with a probability p, of being present in the stream. Let the probability be stored as a column (say prob=$p_i$) in the event schema. For example, if the readings of a particular RFID reader are spurious 10% of the time, each event would have prob=0.9. It is desired to have each pattern CQ output event to be associated with a probability that the pattern actually occurred.

Assume an ATN that matches a desired pattern over a traditional (certain) stream. This is modified to support uncertainty as follows: add an additional entry ($r_{prob}$) in the register to track the probability of pattern occurrence. The default register value is $r_{prob}=1$, and each successful arc transition due to an event $e_i$ simply updates the register value to $r_{prob} \times p_i$. In addition, add a self-loop transition that remains in the same state and sets the new register value to $r_{prob} \times (1-p_i)$, to model the non-occurrence of $e_i$. This solution can lead to a proliferation of partial matches, and is controlled by setting some output probability threshold below which further matching is discontinued. Note that support is added for uncertain streams without modifying the underlying DSMS or the ATN execution model.

Cases are also supported where each event can take on different values with varying probabilities. For example, a sensor may produce events reporting an object's color as blue with probability $p_{blue}=0.7$, indigo with probability $P_{indigo}=0.2$, and green with probability $p_{green}=0.1$. Here, the alternative values are modeled as a "multi-event" that contains value-probability pairs. Any use of e.color=a in a fence function becomes $p_a>0$, and the corresponding transfer function is used to update a cumulative probability in a register: $r_{prob}=r_{prob} \times p_a$. Note that with this construction, the number of states and arcs in the ATN does not change, and the uncertainty is handled by the existing mechanisms for managing multiple in-flight partial matches.

A use of the ATN operator is as a mechanism for introducing user-defined operators (UDOs) into a DSMS. A UDO is an operator written by a user that performs a specific function (complementary to native operators such as selection or joins). Common uses of UDOs include writing custom aggregates (such as time-weighted averages) and application specific stateful transformations (e.g., probabilistic model maintenance). The two-state ATN shown in FIG. 6 can be used to support UDOs.

Briefly, functions $f_0$ and $g_0$ associated with the self-loop $a_0$ are used to accept incoming events and update the operator's internal state (according to the user-defined operator logic), which is stored in the register. The outgoing transition $a_1$ is triggered whenever the UDO needs to generate output.

Sensor data cleaning is becoming a desired application for streams. Streaming data can be cleaned using multiple stages, each of which is a CQ to clean the stream in different ways. ATNs can be used to perform some stages of cleaning certain kinds of data. For example, with RFIDs on books, there might be a standard pattern of how a book moves through a library (e.g., remove from shelf, check out, re-shelf, etc.). If certain events are missing in a pattern, an ATN can be used to "impute" the events. In other words, the ATN recognizes the expected pattern with a missing step, and outputs a "fill-in" event with that step. Note that this process may require complex calculations (e.g., interpolation) based on state accumulated from the other events.

With respect to chart patterns, consider the more complicated head and shoulders chart pattern 800 of FIG. 8 to look for a trading pattern that starts at price $p_1$, moves up to local maximum $p_2$, declines to local minimum $p_3>p_1$, climbs to local maximum $p_4>p_2$, declines to local minimum $p_5>p_1$, climbs again to local maximum $P_6<p_4$, and finally declines to below the starting price $p_1$. The ATN 900 of FIG. 9 can be used to detect this pattern, where three registers ($r_1, r_2, r_3$) are used to track prices $p_1, p_2$, and $p_4$, respectively.

With respect to implementing the ATN operator, algorithms are now presented to build the ATN operator $O_M$ in a streaming system. A goal is to support out-of-order events, retractions, and state cleanup. A basic algorithm is presented for static patterns. In subsequent description, modifications are made to the basic algorithm to handle dynamic patterns, ignorable edges, and more aggressive state cleanup.

With respect to storing arcs, internally, the ATN operator maintains an arc table—a hash table indexed by state. For each state q, the arc table contains a list of arcs that originate from q. Each arc is a structure with pointers to the fence and transfer functions ($f_i$ and $g_i$) that are provided by the user as part of the ATN specification.

With respect to memory management, events in a DSMS are stored in an in-memory pool of pages. Since registers are similar to events (with a predefined schema), the event infrastructure can be leveraged to support registers. Thus, registers and events share the page pool, and the disclosed data structures only manage pointers to events and registers. For simplicity, the terms "events" and "registers" are used to refer to these pointers.

Figure 10:
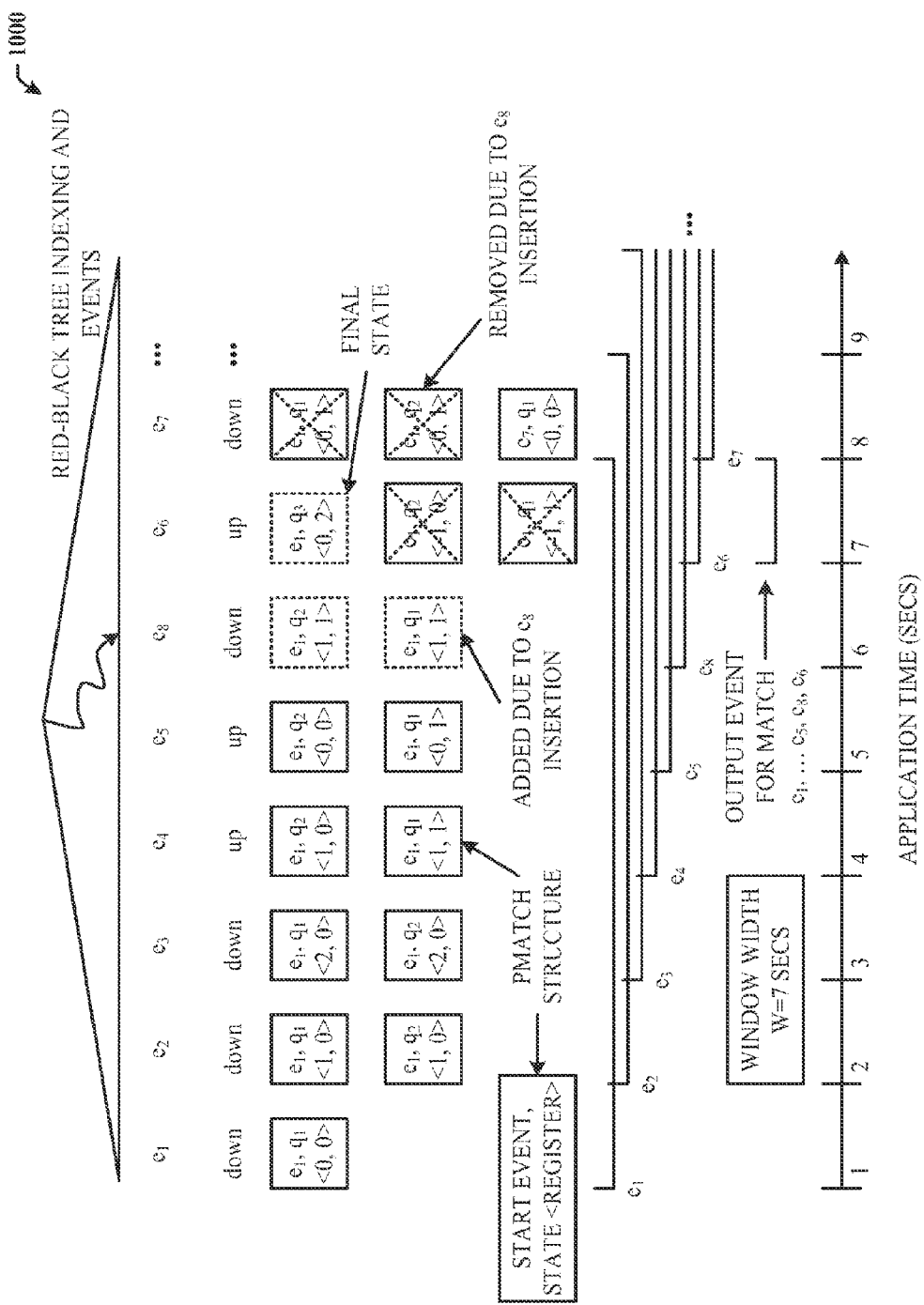
FIG. 10 illustrates a data structure of a streaming ATN model that can handle disordered streams.

FIG. 10 illustrates a data structure 1000 of a streaming ATN model that can handle disordered streams. With respect to data structures, a data structure called a pmatch (for partial match) is used to store computation state for potentially incomplete pattern matches. A pmatch is conceptually associated with an ordered subsequence $e_0 \ldots e_k$ of received events, where $e_0$ and $e_k$ are referred to as the StartEvent and EndEvent of the pmatch (lifetimes are denoted by [StartLE, StartRE) and [EndLE, EndRE) respectively). A pmatch node uses four fields (described below) to concisely represent an ID that is derivable from the initial ID by executing the ATN on the subsequence $e_0 \ldots e_k$. Note that the corresponding output match lifetime is [EndLE, StartRE).

The pmatch nodes are organized in an efficient data structure to process a new event as quickly as possible. The data structure, called rbtree, uses a red-black tree to index each event by its timestamp (LE). For every event e indexed in the rbtree, a doubly linked list of all pmatch nodes is maintained with EndEvent e.

The following invariants are maintained for the data structure (some of these will be relaxed in subsequent paragraphs):
(Content) In the absence of time-based punctuations, for every ordered subsequence $e_0 \ldots e_k$ of received events where $e_0.RE > e_k.LE$, there exists a pmatch node corresponding to every ID (Ø, q, r) such that $(e_0 \ldots e_k, q_0, Z) \vdash^*_M (\emptyset, q, r)$, where q∈Q. Each pmatch node contains four fields: StartLE=$e_0$.LE, StartRE=$e_0$.RE, q, and r. The pmatch nodes are stored in the linked list associated with $e_k$ in rbtree (thus, EndLE and EndRE are available to the pmatch node).
(Ordering) The pmatch entries in any linked list are maintained in increasing order of StartLE.
(Completeness) The presence of a pmatch entry for the event sequence $e_0 \ldots e_k$ implies the existence of k other pmatch entries in the tree, each corresponding to a distinct prefix of this sequence.
(Cleanup) Let t be the timestamp of the latest time-based punctuation. If e is the latest event with a timestamp less than t, there exist no pmatch entries with EndEvent earlier than e. Further, there exist no events with timestamp<t.

The insert algorithm 1100 of FIG. 11 handles both in-order and out-of-order events (and can be readily extended to handle ε-arcs). The method $Search_\leq(t)$ returns the entry in rbtree with timestamp closest to and ≤t. The method $Search_\geq(t)$ is also defined similarly.

If the inserted event e is out-of-order (with a timestamp t), first, call RemoveInvalidatedSequences (Lines 12-21) to delete the invalidated pmatch nodes from rbtree—these are the pmatch nodes where t lies between StartLE and EndLE, that is, the partial matches that span across t and hence are no longer valid. Start at the rbtree entry with next largest timestamp, and begin deleting pmatch nodes from the linked list until reaching a pmatch with StartLE>t. If a deleted pmatch corresponds to a final state, output a retraction event to compensate for the invalid prior insertion. Repeat the process until reaching an rbtree entry that contains no affected pmatch nodes. By invariant (Completeness), the process can stop because if there were any future affected pmatch node, there would have been an affected pmatch in this entry. This avoids traversing pmatch entries that do not need to be deleted.

In the next three lines (Lines 3-9) the pmatch list corresponding to the immediately previous event is retrieved, and transitions (using the arc table) are applied to each outgoing arc for each pmatch. This process is equivalent to applying the next-ID relation $\vdash_M$ (with input e) to the ID corresponding to each pmatch. Each application of $\vdash_M$ to a pmatch node p returns a set of new pmatch nodes that are said to be derivable from p. This process returns a list L of pmatch nodes for sequences ending at e. An attempt to start a new match (from $q_0$) beginning at event e is made and appended to L. If any reached state is final, an output event is produced that indicates successful pattern match. Event e is added to rbtree and associated with list L, which follows the (Ordering) invariant by construction.

The final step (Lines 22-28) in case of out-of-order events, is to apply subsequent events (that were received previously) in rbtree to the matches in L. This process continues until no new pmatch nodes get created. Note that during this process, the (Ordering) invariant can be maintained without having to sort the pmatch lists (see Line 27).

The algorithm 1100 traverses no more arcs and visits no more pmatch nodes than the minimum needed. The algorithm is fully speculative, that is, it produces output aggressively and retracts as necessary. In addition, maximal pre-computations are performed, that is, when an out-of-order event arrives only the ATN steps starting from that event forward are computed. The algorithm 1100 accesses events and registers in a column-major order (in rbtree), which makes the events and registers more cache-friendly than using horizontal pointers between related pmatch nodes.

Consider an example of ATN Insertion. The data structure 1000 of FIG. 10 can be used for the running example, after $e_1 \ldots e_5 e_6$ have arrived and $e_8$ is being inserted. Four invalidated pmatch nodes are deleted, and then new nodes created for $e_8$. One of these matches is propagated to entry $e_6$ as a new pmatch—this is at the final state and causes output of an event with the lifetime shown.

With respect to a delete algorithm, it is possible that an upstream CQ operation deletes (retracts) an event that it issued earlier. Deletion of an event e proceeds by first invoking RemoveInvalidatedSequences with the timestamp of e, in order to delete matches that depend on e, and issue the necessary output retractions. After removing this entry from rbtree, new matches are sought continuing from the entry before e, by invoking PropagateInsert for that entry.

With respect to a cleanup algorithm, efficient cleanup is desired since memory is usually an important constraint in a DSMS. Let cover(t) denote the latest event in rbtree with a timestamp earlier than t. Invariant (Cleanup) is used to guide the algorithm. When a time-based punctuation for timestamp t is received, the rbtree is traversed from left to right, deleting the pmatch entries and events, until reaching cover(t). This event is deleted, but its pmatch entries (and the entry in rbtree) are left untouched. Subsequent events and pmatch nodes are retained because out-of-order events may need to access them for applying transitions. Further, all output events can be declared with a timestamp before t as final, by sending out a punctuation t.

Notice that events and pmatch entries can be cleaned even if their constituent event lifetimes extend beyond the latest punctuation. Such aggressive cleanup is possible because the latest set of pmatch entries just before t cover all previous entries. In order words, since it is known that there can be no new event with a timestamp before t, the earliest possible out-of-order event insertion will require looking up no earlier than cover(t). More aggressive cleanup using predicate-based punctuations are described below.

With respect to controlling operator speculation, the algorithms above are maximally speculative, that is, when there are two consecutive events (in terms of their timestamps), matches are output that contain the events. If an out-of-order event is received between them, the match may need to be retracted. Two techniques for limiting speculation are described.

With respect to leveraging event-ordering information, in many cases, such as patterns over RFID readings or stocks, for example, it may be possible for the source to provide additional ordering information as part of the event. This information can be in the form of a sequence number that increases by one for every event. The user is allowed to optionally specify an expression over the event schema that provides the sequence number. The sequence numbers can be leveraged to build an optimized version of the operator (called ATN+O).

1. Avoid performing ATN transitions across events with sequence numbers that are not adjacent. In this case, the algorithm is speculation-free in terms of output, while at the same time performing maximal pre-computation for expected out-of-order events.
2. Index events by sequence numbers instead of timestamps. The red-black tree can be replaced with a hash table on sequence numbers, since the calls $Search_\leq(x)$ and $Search_\geq(x)$ can now be replaced by hash table lookups for x and x−1 or x+1.

With respect to controlling speculation, the input stream can be fed into an operator called Cleanse that is placed before the ATN operator. Cleanse accepts a speculation factor σ as part of its specification. If the latest punctuation has timestamp t, Cleanse maintains the invariant that only events with a timestamp less than t+σ are propagated. Other events are buffered and stored in-order within Cleanse. Thus, when a new punctuation with timestamp t' arrives, Cleanse releases the buffered events with timestamp less than t'+σ, in timestamp order. By varying σ, the aggressiveness can be controlled in a fine-grained manner. For example, σ=0 implies that the Cleanse output is always in-order and released only at punctuations, and forces $O_M$ into zero speculation. Similarly, σ=∞ implies that Cleanse acts as a pass-through, causing $O_M$ to be maximally speculative. If it is desired that the ATN operator compute matches aggressively, but control output size (also called chattiness) in a fine-grained manner, place the Cleanse operator can be placed at the output of the ATN operator. This option may be useful when the ATN is highly data reducing, such as when there are few pmatch nodes and many events can be discarded by the ATN using optimizations that we discuss in later sections. In such cases, it may be better to push events through the operator instead of buffering them at the input.

Figure 12:
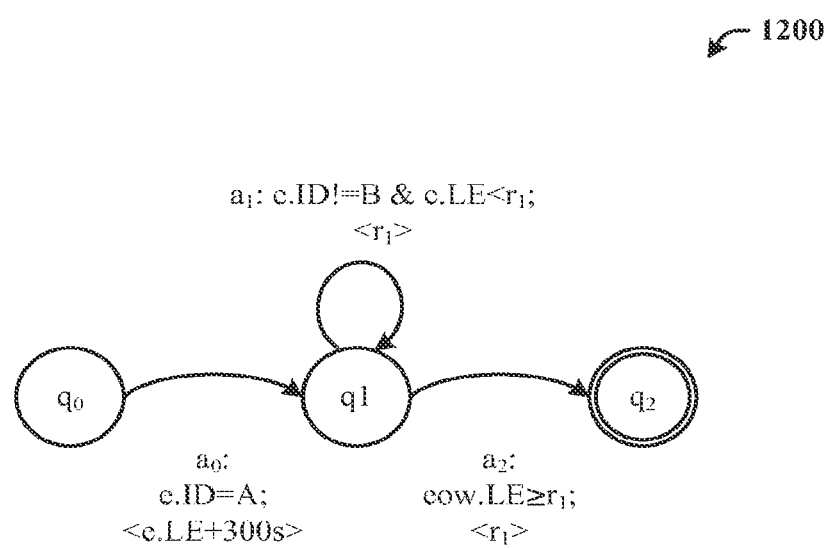
FIG. 12 illustrates a negative pattern ATN.

The disclosed execution model is sufficiently flexible to directly specify patterns with positive and negative subpatterns, and provide an efficient execution layer for languages that can express pattern CQs with negation. The case where a negative subpattern appears between positive subpatterns is easily handled by a single ATN. Consider the more complicated corner case where the pattern ends with a negative subpattern. For example, it is desired to detect a trade for stock A, followed by no trades of a competing stock B within w=300 secs. This query can be written using the negative pattern ATN 1200 of FIG. 12. The register ($r_1$) tracks the timeout for detecting the absence of stock B, and $a_1$ is a special arc that is triggered by an end-of-window (eow) indicator (this can be implemented, for example, using punctuations). Note that this corner case can alternately be handled using a separate anti-semijoin stream operator.

A capability of the disclosed architecture is the seamlessly handling of dynamic patterns, that is, patterns where arcs (and the associated states) may get added or removed with time. Beyond supporting users with changing pattern requirements, dynamic patterns are useful for periodic multi-query re-optimization. An advantage is that users can add and remove ATNs to the DSMS. Periodic re-optimization can be performed using existing techniques such as rewriting state transitions or merging equivalent states. These techniques may result in a new combined ATN that can have commonalities with the current ATN—dynamic patterns allow the deployment of the new ATN without having to destroy the existing one and redeploy. Arcs can simply be added and removed to the current ATN without losing partially computed common information.

A concept behind the disclosed architecture is to treat the ATN arcs A as a second streaming event input to the operator. An arc-event $e_a$ for an arc a from state $q_x$ to state $q_y$ is an event that contains a payload and a lifetime. The payload has the form $\langle q_x, q_y, f, g, isFinal \rangle$. Here, is Final is a Boolean that, in case $q_y$ is a newly added state to the ATN, indicates whether $q_y \in F$. Functions $f(E, R)$ and $g(E, R)$ are as defined earlier. Deletion of existing arcs is performed using arc-event retraction.

The arc-event $e_a$ has a lifetime [$e_a$.LE, $e_a$.RE). The semantics of ATN computation are modified to take arc lifetimes into account. Specifically, the next-ID relation for an arc-event $e_a$ corresponding to event-consuming arc a is (eα, q, r)⊢$_M$ (α, q', r') if $f(e, r)$ is true, $g(e, r)=r'$, and $e_a$.LE≤$e_a$.LE<$e_a$.RE. If a is an ε-arc, (α, q, r)⊢$_M$ (α, q', r') if $f(-, r)$ is true, $g(-, r)=r'$, and $e_a$.LE≤e.LE<$e_a$.RE, where e is the event whose consumption (indirectly) triggered $e_a$. In other words, given an arc-event $e_a$ with lifetime [$e_a$.LE, $e_a$.RE), only events with a timestamp stabbing [$e_a$.LE, $e_a$.RE) can trigger arc a. Arcs arc stored in the arc table as before, along with associated lifetimes. Before applying an ATN computation, the above check is used to ensure that the arc is valid for the computation.

With respect to handling punctuations, punctuation along the arc input with timestamp t implies no future arcs with a timestamp less than t. Let $t_e$ and $t_a$ denote the latest punctuations along the event and arc inputs respectively. For the purpose of ATN state cleanup using the techniques described earlier, the effective incoming punctuation for the ATN operator is $t_p=\min(t_e, t_a)$ instead of $t_e$. This is appropriate, because in case $t_a<t_e$, a subsequent arc-event with LE≥$t_e$, can require the computation of ATN transitions using existing events with a timestamp of $t_a$ or more. Finally, an arc-event $e_a$ can be discarded when the effective punctuation is $e_a$.RE or more.

The semantics for a match allow the cleanup of an event e as soon as the punctuation crosses e.LE. The alternate semantics, where an event is affected by an arc-event if their lifetimes intersect, may imply that the need to retain an event e until the punctuation crosses e.RE; before this time, an inserted arc-event could intersect e's lifetime and require ATN computation with e.

With respect to practical lifetime restrictions, the most common usage scenario for dynamic patterns is the case where users want an arc insertion (or deletion) to apply to all future events from the point of insertion forwards. This default operation mode is supported, where users do not specify arc-event lifetimes. Let $t_{curr}=\max(t_e, t)$, where t denotes the largest timestamp across all events received on the first input to the operator. When a new arc-event $e_a$ is received on the second input, its lifetime is implicitly set to $(t_{curr},\infty)$. Arc deletions correspond to a change in arc-event lifetime from the old lifetime (LE, $\infty$) to the new lifetime (LE, $t_{curr}$]. Finally, the arc punctuation $t_a$ is always implicitly $t_{curr}$ which makes the effective punctuation $t_p=t_e$ instead of $\min(t_e, t_a)$, since $t_e \leq t_a$. Thus, the effective punctuation is identical to the static pattern case.

Consider an example of dynamic patterns. Referring again to the running example in FIG. 5, each arc $a_0, \ldots, a_5$ is associated with a lifetime of $[-\infty,\infty)$. The change of k to k' is expressed by first deleting arcs $a_3$, $a_4$, and $a_5$, that is, changing their lifetime to $[-\infty, t_{curr}]$. Next, insert three arcs with lifetimes $(t_{curr}, \infty)$ which are similar, but use the new value k'. Future events produce output only if k' V-patterns are encountered. Existing pre-computed state (partial matches) remain valid for the new arcs and future events.

Under the default operation mode, nothing extra is needed when there is an arc-event insertion or deletion, other than updating arctable. This is because under this mode, arcs do not affect existing events. On the other hand, when arc-events are associated with explicit user-specified lifetimes, on the insertion of an arc-event ea with lifetime [$e_a$.LE, $e_a$.RE) from state $q_x$ to $q_y$, the method $Search_\leq(e_a.LE)$ is invoked to locate the first affected event in rbtree (with timestamp$\geq e_a$.LE). The linked list associated with the previous event is traversed to locate partial matches ending at $q_x$, and the new transition applied to each of them (if $q_x$ is the start state, new matches are also started as before). If $q_y$ is a final state, generate new output matches can be generated. This is repeated for each event whose LE stabs the lifetime of arc-event $e_a$. Note that any new pmatch entries created during this process also need to be matched with further events, similar to the PropagateInsert procedure in the algorithm 1100 of FIG. 11. Arc-event deletion is handled in a similar manner.

Efficient support is added for ignorable arcs. An ignorable arc $a_i$ is one that always translates into the next-ID relation (e$\alpha$, q, z)$\vdash_M$ ($\alpha$, q, z) when the fence function $f_i$(e, z) is true. Thus, $a_i$ is a self-loop with transfer function $g_i$(e, z)=z, and can be identified by the operator at query registration time. The naive technique of handling ignorable arcs is to do nothing, since $O_M$ can directly operate correctly without any special handling. However, given that ignorable arcs can be common, these arcs can be optimized.

Recall that a pmatch node for a subsequence $e_0 \ldots e_k$, contains four fields: StartLE=$e_0$.LE, StartRE=$e_0$.RE, q, and r. Observe that a sequence of consecutive transitions along the same ignorable arc results in the creation of identical pmatch nodes in rbtree, which will be stored in consecutive rbtree entries. This observation is leveraged as follows. An interval tree, called itree, is used in association with rbtree. Every maximal consecutive sequence of identical pmatch nodes, $p_1, \ldots, p_j$, where $p_1 \vdash_M p_2 \vdash_M \ldots \vdash_M p_j$, is replaced by (1) a single pmatch node $p_1$ in rbtree (deleting the subsequent identical nodes), and (2) an interval ($p_1$.EndLE, $p_j$.EndLE] in itree that indicates the time interval over which $p_1$ repeats itself, and points to $p_1$. Node $p_1$ is called an anchor node.

With appropriate changes, the algorithm 1100 of FIG. 11 can handle ignorable arcs. To each pmatch node $p_i$, add (1) a pointer to its previous pmatch node, (2) a pointer to each next pmatch node derivable from $p_i$ either directly or via a consecutive sequence of ignorable deleted pmatch nodes, and (3) a pointer to an associated itree interval, if $p_i$ is an anchor.

Figure 13:
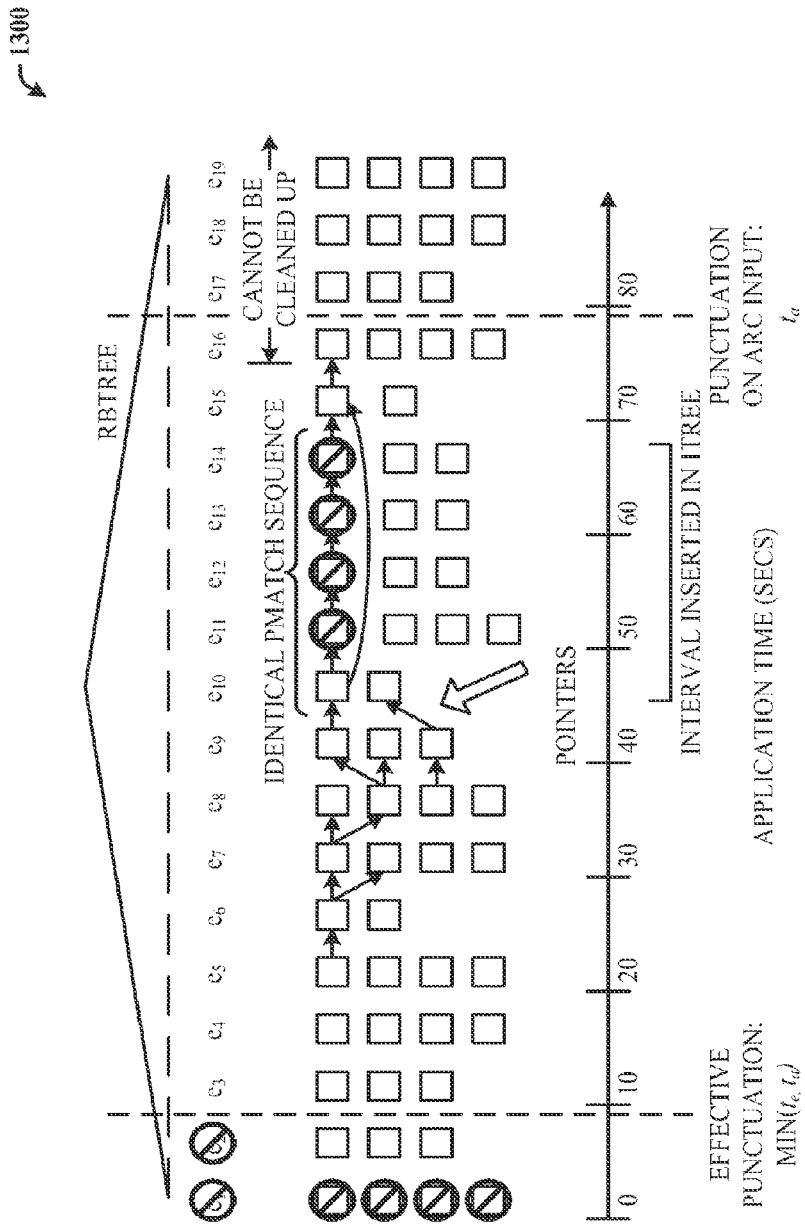
FIG. 13 illustrates a red-black tree with partial match nodes and extra pointers.

Consider the following example of ignorable arcs. In FIG. 13, an rbtree 1300 is shown with pmatch nodes and extra pointers to represent next-ID derivations. The identical pmatch nodes (between events $e_{11}$ and $e_{14}$) are removed, leaving only the anchor at $e_{10}$ with a pointer to its indirect next derivation at $e_{15}$. The corresponding itree entry is also indicated as an interval.

When an event e arrives with timestamp t, perform the following steps:
1. Retrieve the set $S_1$ of immediately preceding pmatch nodes via $Search_\leq(t)$. Lookup itree for intervals stabbed by the EndLE of these pmatch nodes; this lookup returns a set $S_2$ of affected anchor pmatch nodes.
2. Apply ignorable arcs to each node p in $S=S_1 \cup S_2$, and denote the set of successful nodes by $S_3$. The current derivations of p$\in S_3$ can be left untouched since e does not invalidate any of them. If p is already an anchor, its interval is extended if necessary; otherwise, convert it into an anchor and add the corresponding interval in itree.
3. For each node p in $(S-S_3)$, iteratively invalidate all their derived pmatch nodes (by following the next pointers). If p is an anchor, the right endpoint of the interval is truncated to t.
4. Finally, MakeTransitions (for non-ignorable arcs only) is invoked for the nodes in S, followed by PropagateInsert for the new pmatch nodes.

The worst-case per-event overhead is O(k lg k), where k is the number of maximal sequences of identical pmatch nodes. Delete proceeds similarly. Cleanup using a punctuation with timestamp $t_p$ proceeds as usual; however, an interval in itree and the associated pmatch anchor can be cleaned up only when cover($t_p$) lies after the right endpoint of the interval.

With respect to avoiding frequent itree updates, in the common case of in-order events that cause the buildup of an increasingly long sequence of identical pmatch nodes, it is desired to avoid updating itree after every event. To handle this situation, when receiving an in-order event that first triggers an ignorable arc, the anchor $p_1$ is associated with the interval ($p_1$.EndLE, $\infty$) in itree. Thus, if subsequent events are part of the same sequence, itree does not have to be updated. When a new event e does not trigger the ignorable arc, the sequence ends and the interval is truncated to ($p_1$.EndLE, e.EndLE).

Note that when receiving an out-of-order event that performs an ignorable transition, the spanning matches are not invalidated and rebuilt. This helps reduce chattiness at the output, and improves throughput when the percentage of ignorable events is high. Finally, note that the events contributing to ignorable arcs are not deleted, since these events may be used to compute transitions due to out-of-order events (and be needed if the ATN changes due to arc-events). Events and registers are cleaned up using punctuations and specialized techniques described herein.

Figure 8:
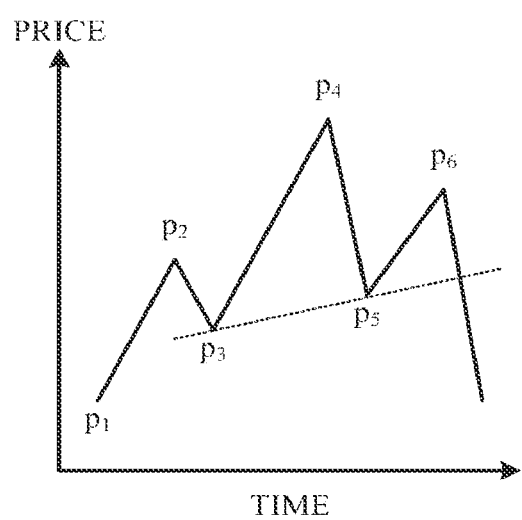
FIG. 8 illustrates an example head-and-shoulders chart pattern.
Figure 9:
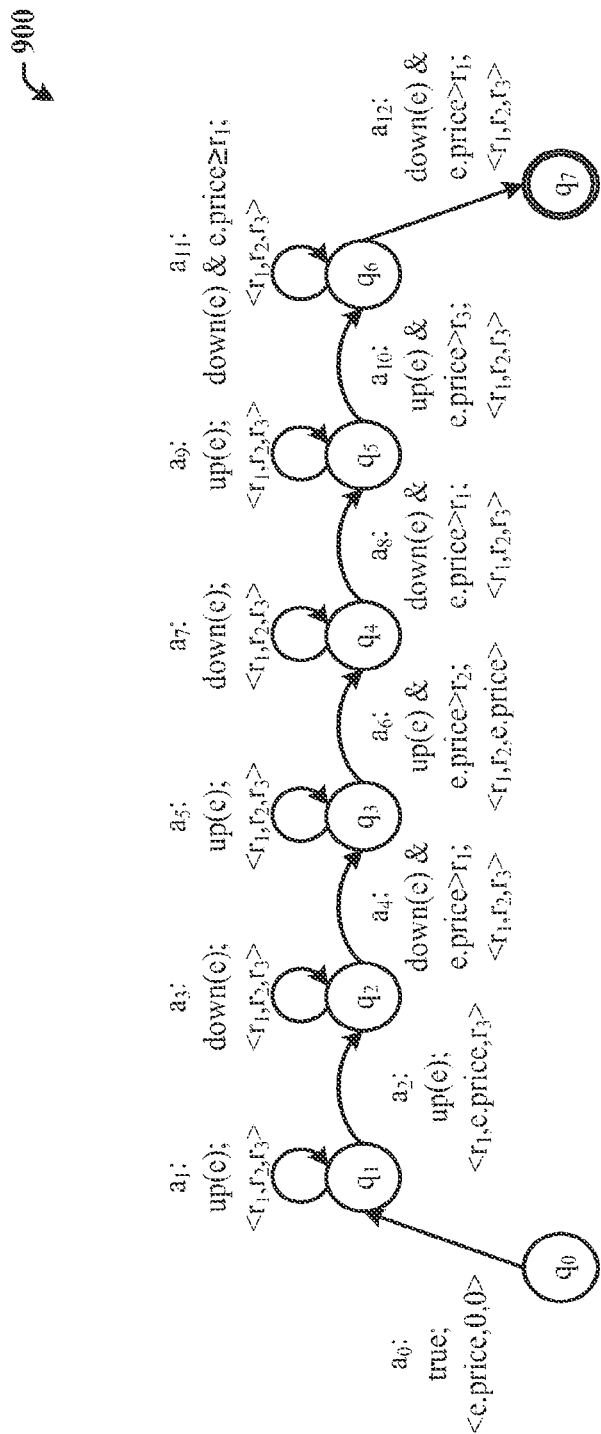
FIG. 9 illustrates an ATN for the head-and-shoulders chart pattern of FIG. 8.

With respect to cleaning up state in ATNs, consider the rbtree of old FIG. 8. The left line is the effective punctuation $t_p=\min(t_e, t_a)$ (the minimum of the punctuations along the event and arc inputs). The right line is $t_a$. Recall that cover(t) denotes the latest event with a timestamp earlier than t. Items at cover($t_a$).LE and later cannot be cleaned up because an arbitrary arc may be inserted in future. Items earlier than cover($t_p$).LE can be cleaned up as depicted in FIG. 13.

Following is a description of extensions for more aggressive cleanup between these two timestamps.

With respect to aggressive event deletion, consider the special case where (1) the fence function $f_i$ (E, R) associated with an arc $a_i$ is expressible as a conjunction $f_i^E(E) \wedge f_i^R(R)$, and (2) the transfer function $g_i(E, R)$ is reducible to $g_i^R(R)$ (it is computable only over the previous register).

The triggering set of an event e is defined as the set of arcs $a_i$ such that $f_i^E(e)$ is true. If events are large in size, an event e can be deleted and the event pointer in rbtree replaced with its triggering set L (note that this requires computing $f_i^E(e) \forall a_i \in A$). This optimization is possible because there is no longer a need for event e to determine if an arc $a_i$ is triggered—only need to check whether $a_i \in L$; and if yes, apply the fence function $f_i^R(r)$, where r is the previous register value. Further, if $a_i$ is triggered, the new register value is computed by invoking the transfer function $g_i^R(r)$.

With respect to leveraging punctuations with predicates, assume that (1) the fence function $f_i$ (E, R) associated with an arc $a_i$ is expressible as a conjunction $f_i^E(E) \wedge f'_i$ (E, R), and (2) there are no retractions in the input stream to $O_M$.

Predicated punctuations can be leveraged to clean state more aggressively. A predicated punctuation, also called a partial order guarantee, is associated with a timestamp t and a condition C, and is a guarantee that no event arriving in the future and satisfying C can have a timestamp earlier than t. Predicated punctuations may be inserted when performing a union across multiple streams, by a data source, based on application semantics or by network protocols.

The predicated punctuations and the ATN graph structure can be used to determine what additional registers and events can be deleted. An arc punctuation for an arc $a_i$ is the largest timestamp $\pi_i$ with a guarantee that no event e arriving in the future and for which $f_i^E(e)$ is true, can have a timestamp earlier than $\pi_i$. The set of predicated punctuations can be used to infer an arc punctuation for every arc in the ATN. For example, assume that a stream contains a union of sensor readings across multiple floors of a building. If an arc $a_i$ has the fence condition $f_i^E(E)=\{Floor=3 \wedge Tempera ture>95\}$ and have a predicated punctuation with timestamp 20 and condition $\{Floor \leq 3\}$, it can be inferred that $\pi_i=20$.

A path punctuation with timestamp $\bar{\pi}(p)$ for a path $p=a_i \ldots a_k$ in the ATN directed graph is a promise that no future out-of-order event with timestamp earlier than $\bar{\pi}(p)$ can trigger $a_1$ and then cause the execution of all subsequent transitions along path p.

With respect to computing path punctuations, as a first step, $\bar{\pi}(p)$ for a path $p=a_1 \ldots a_k$ can be set to $\pi_1$, since clearly no future event with timestamp earlier than $\bar{\pi}_1$ can trigger $a_1$. An improvement uses algorithm 1400 of FIG. 14 which leverages the ATN structure. Consider the path $p=a_1 \ldots a_k$. Start with $\bar{\pi}(p)=\bar{\pi}_1$. In Lines 3-6, for each arc $a_j$ on the path p, look at the existing events and $\pi_j$ to try and push $\bar{\pi}(p)$ ahead (Lines 4 and 5) to the latest possible timestamp $t \geq \bar{\pi}(p)$ such that a traversal of arc $a_j$ at timestamp earlier than t is not possible. Intuitively, the non-existence of a later event e that can cause transition $a_j$ implies that a match traversing the path from $a_1$ to $a_j$ is not possible. The computation of $\bar{\pi}(p)$ can be optimized for many paths in the graph, by sharing and reusing partial results using memorization.

With respect to cleaning state, recall that each ATN register is associated with a pmatch node in some ATN state. Consider each non-final state q in turn. Let $t_1$ denote the minimum $\bar{\pi}(p)$ across the set of unique paths p in M from q to some final state, where uniqueness is determined by the set of edges in p. Delete registers (e.g., all) corresponding to pmatch entries (in rbtree) that are associated with q and that lie to the left of cover($t_1$) in rbtree (i.e., whose EndLE is less than cover(t).LE). Furthermore, for every event e, let $t_2$ be the minimum $\bar{\pi}(p)$ across all unique paths to a final state that contain (but do not begin with) some arc in e's triggering set. Event e can be deleted if its timestamp is earlier than $t_2$.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 15:
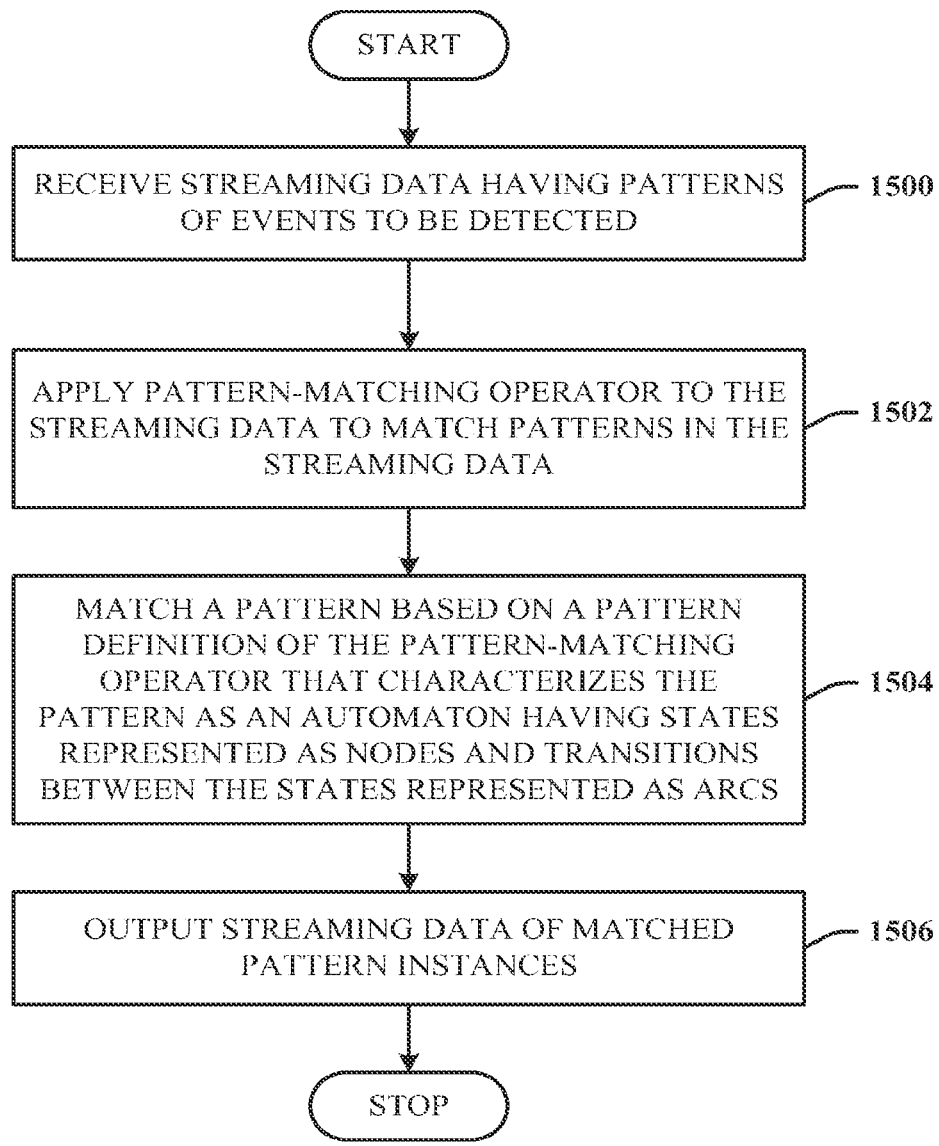
FIG. 15 illustrates a data stream management method.

FIG. 15 illustrates a computer-implemented data stream management method in accordance with the disclosed architecture. At 1500, streaming data is received having patterns of events to be detected. At 1502, a pattern-matching operator is applied to the streaming data to match patterns in the streaming data. At 1504, a pattern is matched based on a pattern definition of the pattern-matching operator that characterizes the pattern as an automaton having states represented as nodes and transitions between the states represented as arcs. At 1506, streaming data of matched pattern instances are output. At this point, it is also possible to replace the existing pattern definition with a new pattern definition to match new patterns in the streaming data.

Figure 16:
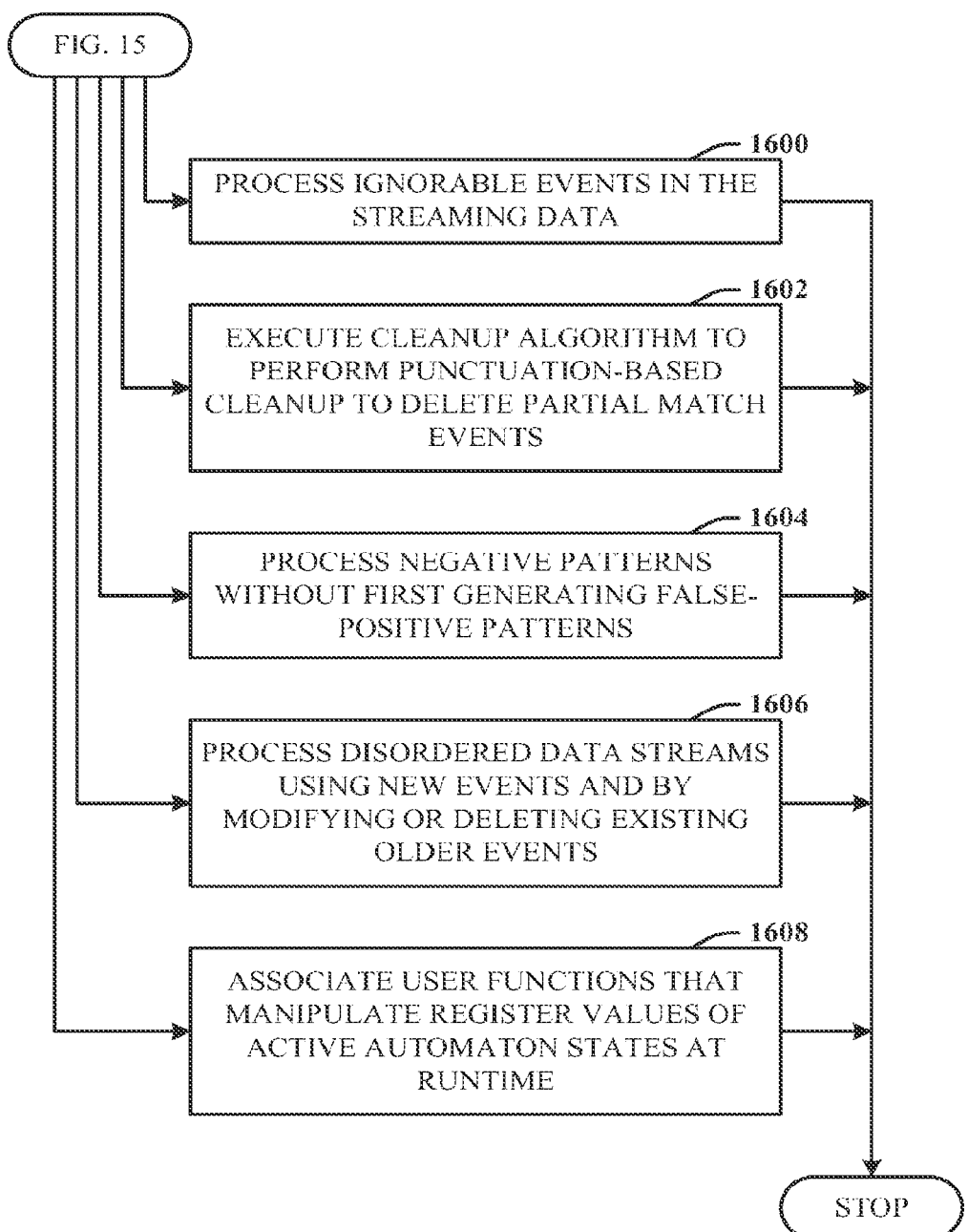
FIG. 16 illustrates further aspects of the method of FIG. 15.

FIG. 16 illustrates further aspects of the method of FIG. 15. At 1600, ignorable events in the streaming data are processed. At 1602, a cleanup algorithm is executed to perform punctuation-based cleanup to delete partial match events. At 1604, negative patterns are processed without first generating false-positive patterns. At 1606, disordered data streams are processed using new events and by modifying or deleting existing older events. At 1608, user functions are provided that manipulate register values of active automaton states at runtime.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 17:
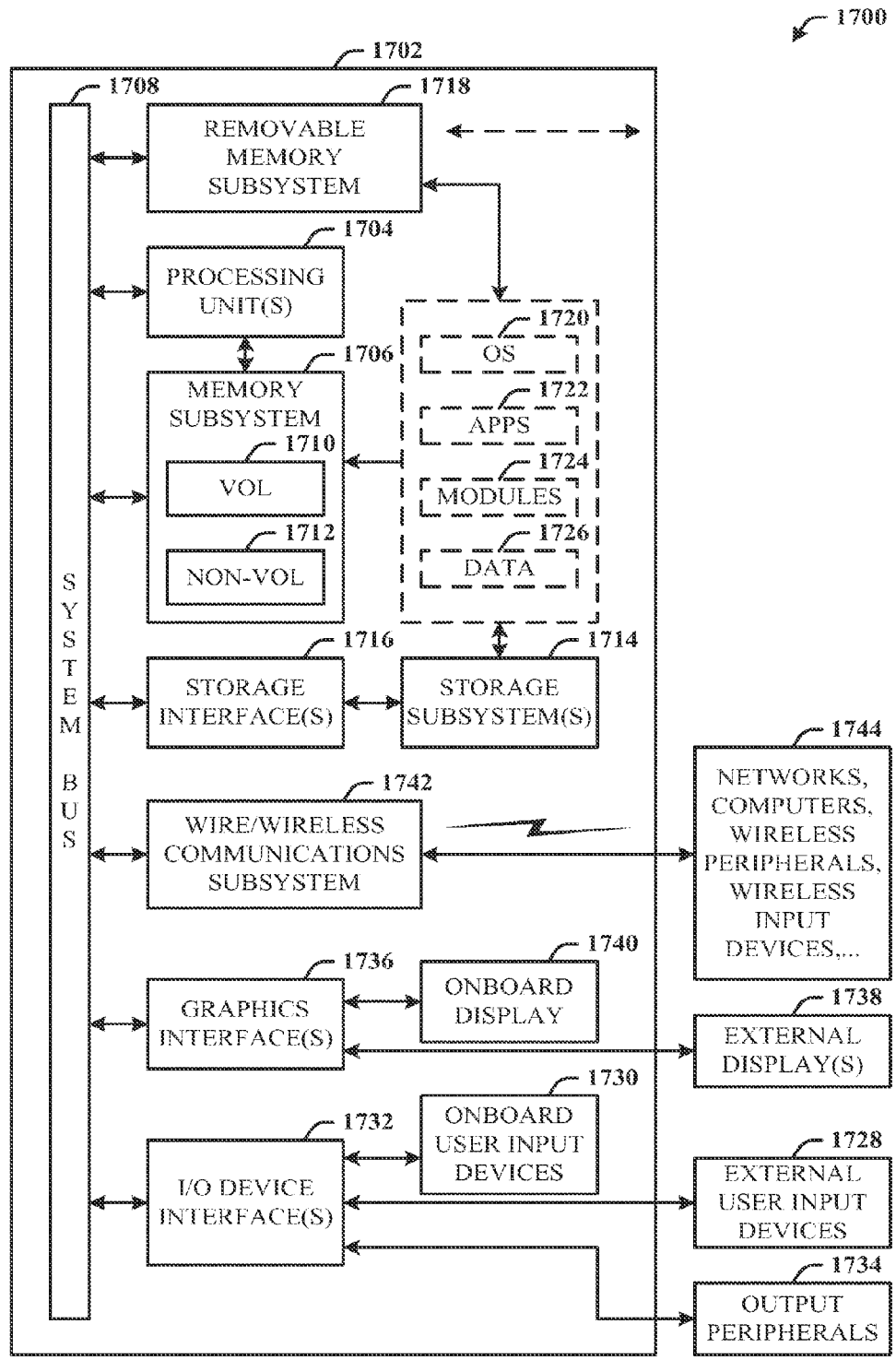
FIG. 17 illustrates a block diagram of a computing system that executes dynamic pattern matching over ordered and disordered streams in accordance with the disclosed architecture.

Referring now to FIG. 17, there is illustrated a block diagram of a computing system 1700 that executes dynamic pattern matching over ordered and disordered streams in accordance with the disclosed architecture. In order to provide additional context for various aspects thereof, FIG. 17 and the following description are intended to provide a brief, general description of the suitable computing system 1700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1700 for implementing various aspects includes the computer 1702 having processing unit(s) 1704, a computer-readable storage such as a system memory 1706, and a system bus 1708. The processing unit(s) 1704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1706 can include computer-readable storage (physical storage media) such as a volatile (VOL) memory 1710 (e.g., random access memory (RAM)) and non-volatile memory (NON-VOL) 1712 (e.g., ROM, EPROM, EEPROM, etc.). A basic input/output system (BIOS) can be stored in the non-volatile memory 1712, and includes the basic routines that facilitate the communication of data and signals between components within the computer 1702, such as during startup. The volatile memory 1710 can also include a high-speed RAM such as static RAM for caching data.

The system bus 1708 provides an interface for system components including, but not limited to, the system memory 1706 to the processing unit(s) 1704. The system bus 1708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1702 further includes machine readable storage subsystem(s) 1714 and storage interface(s) 1716 for interfacing the storage subsystem(s) 1714 to the system bus 1708 and other desired computer components. The storage subsystem(s) 1714 (physical storage media) can include one or more of a hard disk drive (HDD), a magnetic floppy disk drive (FDD), and/or optical disk storage drive (e.g., a CD-ROM drive DVD drive), for example. The storage interface(s) 1716 can include interface technologies such as EIDE, ATA, SATA, and IEEE 1394, for example.

One or more programs and data can be stored in the memory subsystem 1706, a machine readable and removable memory subsystem 1718 (e.g., flash drive form factor technology), and/or the storage subsystem(s) 1714 (e.g., optical, magnetic, solid state), including an operating system 1720, one or more application programs 1722, other program modules 1724, and program data 1726.

The one or more application programs 1722, other program modules 1724, and program data 1726 can include the entities and components of the system 100 of FIG. 1, the entities and components of the system 200 of FIG. 2, the entities and components of the system 300 of FIG. 3, the models, algorithms, data structures of FIGS. 4-14, and the methods represented by the flowcharts of FIGS. 15-16, for example.

Generally, programs include routines, methods, data structures, other software components, etc., that perform particular tasks or implement particular abstract data types. All or portions of the operating system 1720, applications 1722, modules 1724, and/or data 1726 can also be cached in memory such as the volatile memory 1710, for example. It is to be appreciated that the disclosed architecture can be implemented with various commercially available operating systems or combinations of operating systems (e.g., as virtual machines).

The storage subsystem(s) 1714 and memory subsystems (1706 and 1718) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1702 and includes volatile and non-volatile internal and/or external media that is removable or non-removable. For the computer 1702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1702, programs, and data using external user input devices 1728 such as a keyboard and a mouse. Other external user input devices 1728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1702, programs, and data using onboard user input devices 1730 such a touchpad, microphone, keyboard, etc., where the computer 1702 is a portable computer, for example. These and other input devices are connected to the processing unit(s) 1704 through input/output (I/O) device interface(s) 1732 via the system bus 1708, but can be connected by other interfaces such as a parallel port, IEEE 1394 serial port, a game port, a USB port, an IR interface, etc. The I/O device interface(s) 1732 also facilitate the use of output peripherals 1734 such as printers, audio devices, camera devices, and so on, such as a sound card and/or onboard audio processing capability.

One or more graphics interface(s) 1736 (also commonly referred to as a graphics processing unit (GPU)) provide graphics and video signals between the computer 1702 and external display(s) 1738 (e.g., LCD, plasma) and/or onboard displays 1740 (e.g., for portable computer). The graphics interface(s) 1736 can also be manufactured as part of the computer system board.

The computer 1702 can operate in a networked environment (e.g., IP-based) using logical connections via a wired/wireless communications subsystem 1742 to one or more networks and/or other computers. The other computers can include workstations, servers, routers, personal computers, microprocessor-based entertainment appliances, peer devices or other common network nodes, and typically include many or all of the elements described relative to the computer 1702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1702 connects to the network via a wired/wireless communication subsystem 1742 (e.g., a network interface adapter, onboard transceiver subsystem, etc.) to communicate with wired/wireless networks, wired/wireless printers, wired/wireless input devices 1744, and so on. The computer 1702 can include a modem or other means for establishing communications over the network. In a networked environment, programs and data relative to the computer 1702 can be stored in the remote memory/storage device, as is associated with a distributed system. It will be appreciated that the network connections shown are exemplary and other means of establishing a communications link between the computers can be used.

The computer 1702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

Figure 18:
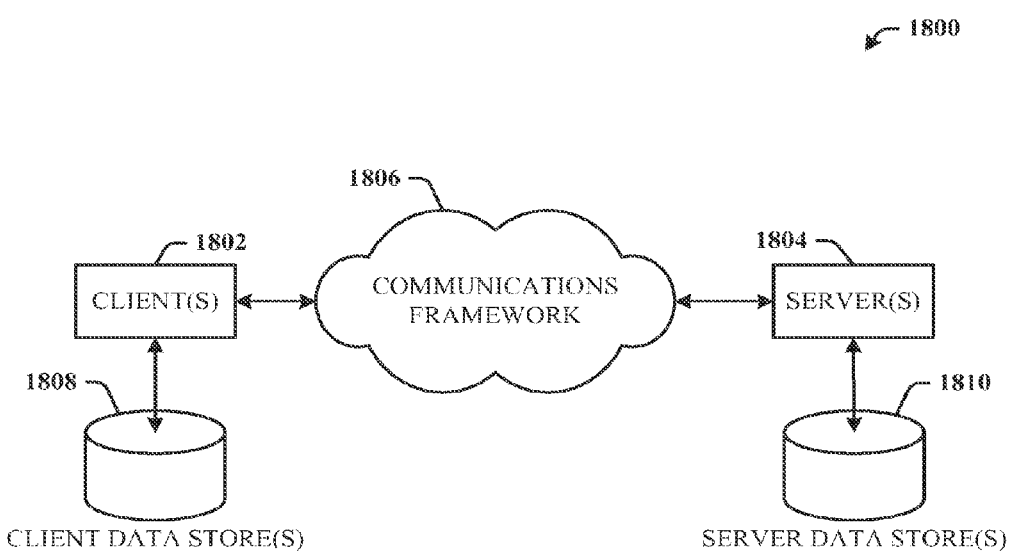
FIG. 18 illustrates a schematic block diagram of a computing environment that performs dynamic pattern matching over ordered and disordered streams.

Referring now to FIG. 18, there is illustrated a schematic block diagram of a computing environment 1800 that performs dynamic pattern matching over ordered and disordered streams. The environment 1800 includes one or more client(s) 1802. The client(s) 1802 can be hardware and/or software (e.g., threads, processes, computing devices). The client(s) 1802 can house cookie(s) and/or associated contextual information, for example.

The environment 1800 also includes one or more server(s) 1804. The server(s) 1804 can also be hardware and/or software (e.g., threads, processes, computing devices). The servers 1804 can house threads to perform transformations by employing the architecture, for example. One possible communication between a client 1802 and a server 1804 can be in the form of a data packet adapted to be transmitted between two or more computer processes. The data packet may include a cookie and/or associated contextual information, for example. The environment 1800 includes a communication framework 1806 (e.g., a global communication network such as the Internet) that can be employed to facilitate communications between the client(s) 1802 and the server(s) 1804.

Communications can be facilitated via a wire (including optical fiber) and/or wireless technology. The client(s) 1802 are operatively connected to one or more client data store(s) 1808 that can be employed to store information local to the client(s) 1802 (e.g., cookie(s) and/or associated contextual information). Similarly, the server(s) 1804 are operatively connected to one or more server data store(s) 1810 that can be employed to store information local to the servers 1804.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   an input component configured to receive streaming data as a first streaming input having a pattern of events to be matched; and
   a pattern-matching operator, implemented using at least one processor, configured to find the pattern in the first streaming input based on a pattern definition received as a second streaming input, the pattern definition characterizes the pattern as an automaton having states represented as nodes and further having transitions between the states, the pattern definition is adjustable on-the-fly during execution of the pattern-matching operator to have arcs at least one of added or removed with time.

2. The system of claim 1, wherein an arc in the automaton has associated user-defined information that includes a fence function that indicates whether a transition along an arc is capable of occurring based on associated data, which is associated with the states, and that further includes a transfer function that computes new values for the associated data.

3. The system of claim 1, wherein the pattern-matching operator processes ordered and disordered patterns of the streaming data.

4. The system of claim 1, wherein the pattern-matching operator handles negative patterns without first generating false-positive patterns.

5. The system of claim 1, further comprising:
   a pattern matching component that employs an event algorithm that is configured to process ignorable events of the streaming data.

6. The system of claim 1, further comprising:
a pattern matching component that employs a cleanup algorithm which performs punctuation-based cleanup to delete partial match events.

7. A computer-readable device that stores executable instructions executed by a processor, comprising:
an input component configured to receive streaming data as a first streaming input, the streaming data having a pattern of events to be matched; and
a pattern-matching operator configured to find the pattern in the first streaming input based on a pattern definition, which is received as a second streaming input, the pattern definition characterizes the pattern as an automaton having states represented as nodes and further having transitions between the states, the pattern definition is adjustable on-the-fly during execution of the pattern-matching operator to have arcs at least one of added or removed with time.

8. The computer-readable device of claim 7, wherein an arc in the automaton has associated user-defined information that includes a fence function that indicates whether a transition along the arc is capable of occurring based on associated data, which is associated with the states, and that further includes a transfer function that computes new values for the associated data.

9. The computer-readable device of claim 7, wherein the pattern-matching operator processes ordered and disordered patterns of the streaming data;
wherein each of the disordered patterns includes at least one event that arrives out-of-order with respect to at least one respective event timestamp that is associated with the at least one respective event; and
wherein the pattern-matching operator is configured to find the pattern in a first disordered pattern of the disordered patterns in response to the pattern-matching operator being applied to the first disordered pattern.

10. The computer-readable device of claim 7, further comprising:
a pattern matching component that employs an event algorithm that is capable of processing ignorable events of the streaming data and a cleanup algorithm that performs punctuation-based cleanup to delete partial match events.

11. The computer-readable device of claim 10, wherein the pattern matching component controls speculation based on pre-computation of expected out-of-order events in the streaming data, and event indexing by sequence numbers or timestamps, and employs predicated punctuation and a graph structure to determine registers and events for deletion.

12. A computer-implemented data stream management method executed by a processor, comprising:
receiving streaming data having a pattern of events to be detected;
applying a pattern-matching operator to ordered and disordered patterns of the streaming data to match the pattern in the streaming data, said applying the pattern-matching operator comprising:
applying the pattern-matching operator to one or more disordered patterns of the streaming data, each of the one or more disordered patterns including at least one event that arrives out-of-order with respect to an event timestamp that is associated with the respective event; and
matching the pattern based on a pattern definition of the pattern matching operator that characterizes the pattern as an automaton having states represented as nodes and further having transitions between the states, said matching the pattern comprising:
matching the pattern to at least one of the one or more disordered patterns in response to applying the pattern-matching operator to the respective disordered pattern.

13. The method of claim 12, further comprising at least one of:
processing ignorable events in the streaming data; or
processing negative patterns without first generating false-positive patterns.

14. The method of claim 12, further comprising:
executing a cleanup algorithm to perform punctuation-based cleanup to delete partial match events.

15. The method of claim 12, further comprising:
processing disordered data streams using new events and by modifying or deleting existing older events.

16. The method of claim 12, wherein an arc in the automaton has associated user-defined information that includes a fence function that indicates whether a transition along an arc is capable of occurring based on associated data, which is associated with the states, and that further includes a transfer function that computes new values for the associated data.

17. The method of claim 12, further comprising:
receiving the pattern definition as a second streaming input.

18. The method of claim 12, wherein the pattern definition is adjustable on-the-fly during execution of the pattern-matching operator to have arcs at least one of added or removed with time.

19. The system of claim 1, wherein the input component is a wired/wireless communications subsystem.

20. The system of claim 1, wherein the input component is a user input device.

21. The system of claim 2, wherein each of the disordered patterns includes at least one event that arrives out-of-order with respect to at least one respective event timestamp that is associated with the at least one respective event; and
wherein the pattern-matching operator is configured to find the pattern in a first disordered pattern of the disordered patterns in response to the pattern-matching operator being applied to the first disordered pattern.

22. The computer-readable device of claim 7, wherein the pattern-matching operator handles negative patterns without first generating false-positive patterns.

23. The method of claim 12, further comprising:
controlling speculation based on pre-computation of expected out-of-order events in the streaming data.

* * * * *